United States Patent
Taylor et al.

(10) Patent No.: US 9,779,605 B1
(45) Date of Patent: Oct. 3, 2017

(54) VIRTUAL REALITY PROXIMITY SENSORS

(71) Applicant: Sony Computer Entertainment Inc., Tokyo (JP)

(72) Inventors: Michael G. Taylor, San Mateo, CA (US); Glenn T. Black, San Mateo, CA (US); Elliot S. Brodzki, San Francisco, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/085,879

(22) Filed: Mar. 30, 2016

(51) Int. Cl.
  *G08B 21/00* (2006.01)
  *G08B 21/02* (2006.01)
  *G01S 13/42* (2006.01)

(52) U.S. Cl.
  CPC .......... *G08B 21/0261* (2013.01); *G01S 13/42* (2013.01)

(58) Field of Classification Search
  CPC ........ G01S 13/42; G09B 21/007; A61H 3/061
  USPC ........................................... 340/686.1, 691.1
  See application file for complete search history.

(56) References Cited

U.S. PATENT DOCUMENTS

| | | | | |
|---|---|---|---|---|
| 2013/0044005 | A1* | 2/2013 | Foshee | G09B 21/007 340/691.1 |
| 2013/0220392 | A1* | 8/2013 | Gassert | A61H 3/061 135/66 |
| 2014/0253362 | A1* | 9/2014 | Einat | G01S 13/887 342/27 |
| 2014/0274205 | A1* | 9/2014 | Goszyk | A61H 3/061 455/556.1 |
| 2016/0127698 | A1* | 5/2016 | Mali | H04N 7/185 348/62 |

* cited by examiner

*Primary Examiner* — Tai T Nguyen
(74) *Attorney, Agent, or Firm* — Kilpatrick Townsend & Stockton LLP

(57) ABSTRACT

A proximity device, a computer-implemented method, and proximity system are described. Generally, the proximity device can be wearable or non-wearable. A wearable proximity device is configured to be worn by a user. As the user moves within a physical environment, the wearable proximity devices monitors the user's proximity to objects. Proximity indications are accordingly generated and presented to the user. A non-wearable proximity device is configured to monitor the user's proximity relative to a perimeter of an area. If the user approaches or overruns the perimeter, a proximity indication is generated and presented to the user.

21 Claims, 15 Drawing Sheets

VIRTUAL REALITY PROXIMITY SENSORS

CROSS-REFERENCES TO RELATED APPLICATIONS

NOT APPLICABLE

BACKGROUND

Virtual reality (VR) headsets are used for different applications. For example, a user wears and operates a VR headset to view content, play a video game, conduct a virtual meeting, or perform other online-related activities.

Generally a VR headset enables an immersive user experience that, over time, has increased in realism, visual appeal, and complexity. For example, in a multiplayer game, a group of friends can play a video game together from the comfort of their own living rooms without having to meet in a single physical location. Each friend operates a VR headset to play a role in the video game. The VR headset displays a high resolution graphical user interface, plays three dimensional audio, and provides a voice service for communication with other friends. Hence, the friends can have a real-life like experience of playing the video game from a same location.

The more advanced the immersive user experience is, the more a user is absorbed in virtual reality. Conversely, the less the user is aware of the surrounding physical environment. Hence, absent physical awareness capabilities, the user can become less sensitive and reactive to the physical environment.

BRIEF SUMMARY

Generally, a wearable proximity device is described. In an example, a user operates a VR headset while wearing the wearable proximity device. The wearable proximity device is configured to provide proximity awareness of objects in a surrounding physical environment. For example, the proximity device monitors proximity of the user to an object. The proximity indicates the approximate distance between the user and the object. The proximity can also indicate a direction of the user's movement. If the distance is smaller than a threshold distance and, as applicable, the user is moving towards the objects, the proximity device generates a proximity indication. The proximity indication is presented to the user via the proximity device and/or the VR headset based on a number of presentation modalities including, for instance, tactile, audible, and/or visual presentations.

In addition, a proximity device that need not be worn by a user is described. The proximity device can be located on the ground or other surfaces or objects in a physical environment. In an example, the proximity device is configured to monitor the proximity of a user to a perimeter of an area. The area represents a stay-in area where the user is expected to remain located or a stay-out area where the user is expected not to enter. Based on a proximity of the user to the perimeter, the proximity device generates a proximity indication. The proximity indication is presented to the user via the proximity device and/or a VR headset based on a number of presentation modalities.

Furthermore, a network of proximity devices is illustrated. The proximity devices are distributed to different locations within a physical environment. Each proximity device monitors the proximity of a user within one or more areas. The monitored areas collectively represent an overall area. As the user moves between the areas, proximity indications are generated to indicate whether the user is leaving one area, entering another area, or leaving the overall area. The proximity indications are presented to the user via the proximity devices and/or a VR headset based on a number of presentation modalities.

In an example, a wearable proximity apparatus includes a housing configured to be worn by a user, a transmitter coupled with the housing, a receiver coupled with the housing, and a signal processor communicatively coupled with a memory and the receiver. The transmitter is configured to transmit a transmitted signal in a direction outward from the user. The receiver is configured to receive a reflected signal based on a reflection of the transmitted signal from an object. The memory stores computer-readable instructions that, upon execution by the signal processor, cause the wearable proximity apparatus to detect a proximity of the object to a user, classify the object as a potential obstacle for the user based on a comparison of the proximity and a threshold, and generate an indication of the potential obstacle. The proximity is detected based on the reflected signal and based on the wearable proximity apparatus being located on the user In an example, a proximity apparatus includes a transmitter configured to transmit a transmitted signal, a receiver configured to receive a reflected signal based on a reflection of the transmitted signal from an object in a physical environment, and a processor communicatively coupled with a memory and with a receiver. The memory stores computer-readable instructions that, upon execution by the processor, cause the proximity apparatus to detect a proximity of the object to the proximity apparatus based on the reflected signal, define a perimeter of an area within the physical environment based on the proximity of the object, detect that a user of a virtual reality headset is within a threshold distance from the perimeter, and generate an indication of the user being located within the threshold distance.

In an example, a proximity system includes a first proximity device, a second proximity device, and a processor communicatively coupled with a memory, the first proximity device, and the second proximity device. The first proximity device is configured to generate first proximity data. The first proximity data indicates a first proximity of a user of a virtual reality headset to a first perimeter of a first area within a physical environment. The second proximity device is configured to generate second proximity data. The second proximity data indicates a second proximity of the user of the virtual reality headset to a second perimeter of a second area within the physical environment. The memory stores computer-readable instructions that, upon execution by the processor, cause the proximity system to define a perimeter of an area within the physical environment based on the first perimeter and the second perimeter, detect that the user of the virtual reality headset is within a threshold distance from the perimeter based on the first proximity data and the second proximity data, and generate an indication of the user of the virtual reality headset is being located within the threshold distance.

A further understanding of the nature and the advantages of the embodiments disclosed and suggested herein may be realized by reference to the remaining portions of the specification and the attached drawings.

DETAILED DESCRIPTION

Figure 1:
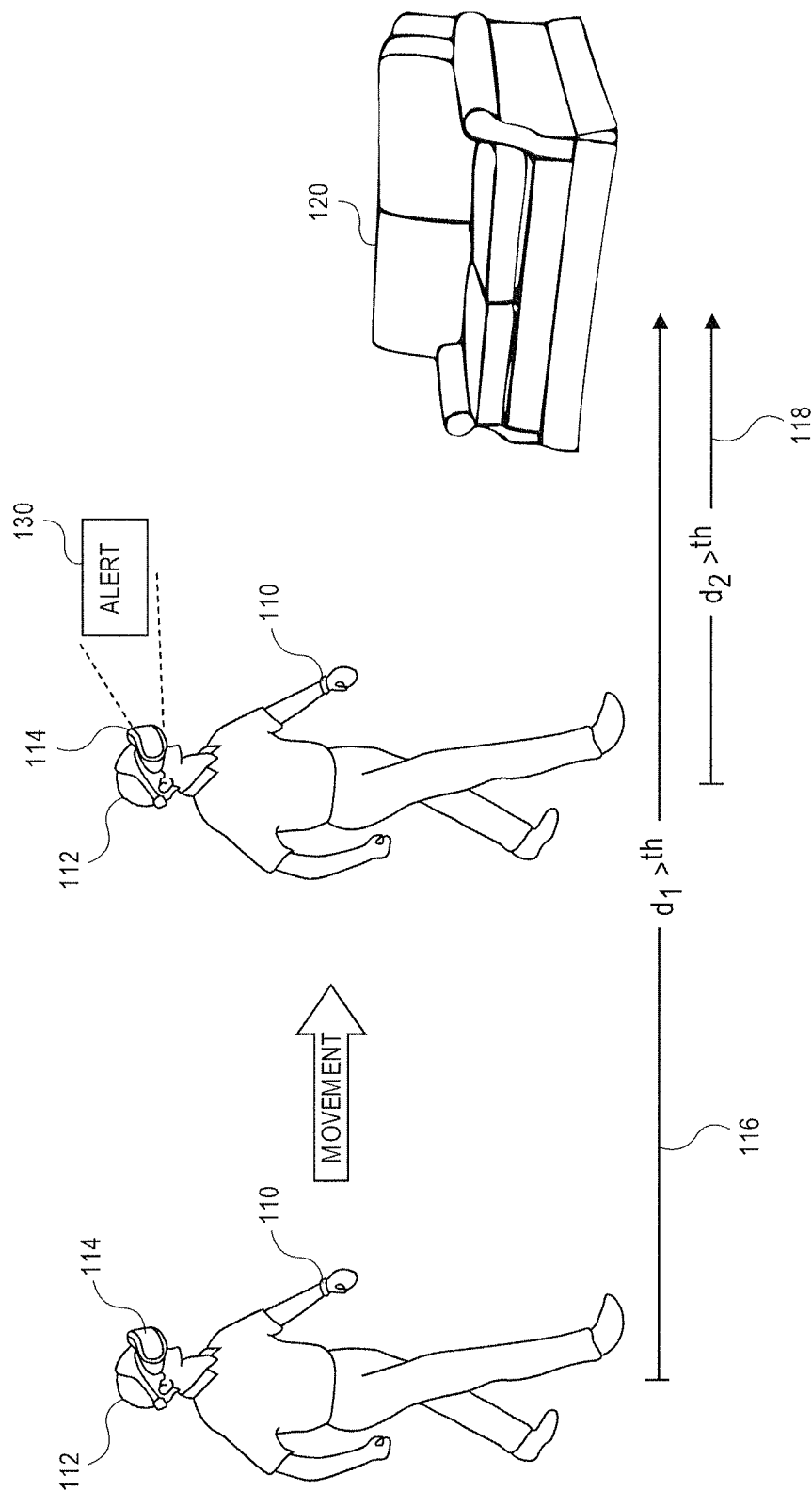
FIG. 1 illustrates an example physical environment, where a wearable proximity device provides awareness to a user about proximity to an object according to an embodiment of the present disclosure.

The present disclosure is directed to, among other things, apparatuses, methods, and systems for providing awareness to a user about a physical environment, while the user is immersed in a virtual reality experience. Generally, the user operates a VR headset in the physical environment. A proximity sensor is also located in the physical environment. The proximity sensor detects a proximity of the user to potential obstacles in the physical environment. Once detected, the proximity sensor generates an indication of a potential obstacle prior to physical contact. The indication is presented to the user as an alert, thereby providing the user with awareness of the potential obstacle and enabling the user to avoid the physical obstacle. Hence, the proximity sensor augments the user's awareness of the physical environment while being immersed in the virtual reality experience.

In an example, a wearable proximity device is used. The wearable proximity device includes a number of proximity sensors and is located on a user of a VR headset. For instance, the wearable proximity device takes the form of a wristband that the user can wear on his or her wrist. Proximity of the user to an object (e.g., a wall) in a physical environment is detected. The proximity includes, for instance, a distance and a direction between the user and the object and can be monitored over time. The object need not include or be altered to include proximity-related components. Once the proximity falls below a threshold (e.g., values of the distance and direction indicate upcoming contact), the wearable proximity device classifies the object as a potential obstacle. To avoid contact, the wearable proximity device generates an indication of the potential obstacle, such as an alert of the potential obstacle or of a potential contact with the object. The indication can be presented using different modalities by the wearable proximity device, the VR headset, or a combination of both. For instance, a vibrating unit of the wearable proximity device is activated to provide tactile awareness. In addition, the VR headset receives the indication from the wearable proximity device and plays an audio beep and displays an overlay on a graphical user interface to warn the user. Examples of the wearable proximity device are further illustrated in FIGS. 1-4.

In another example, a proximity device is used, where the proximity device is not located on the user. Instead, the proximity device is located in other locations of the physical environment, such as on the ground, a ceiling, or a furniture piece. Here also, proximity sensors of the proximity device are used to detect proximity of the user to an object in the physical environment. The object need not include or be altered to include proximity-related components. Based on a number of such objects, the proximity device can define an object-free area. This area represents a safe zone within which the user can move freely without a risk of coming in contact with objects. The proximity device monitors the proximity of the user to an outer perimeter of the area. If the user becomes too close (e.g., within a certain threshold distance from the outer perimeter), the risk of object contact increases. Accordingly, the proximity device generates an indication of the proximity to the outer perimeter, such as an alert of potentially leaving the safe zone. The indication can be presented using different modalities by the proximity device, the VR headset, or a combination of both. For instance, an audio speaker of the proximity device is activated to provide a loud beep. In addition, the VR headset receives the indication from the proximity device, plays a similar audio beep, and displays an overlay on a graphical user interface to warn the user. Examples of the proximity device are further illustrated in FIGS. 5-10.

In yet another example, multiple proximity devices are used and form a network of proximity devices. The proximity devices are distributed in different locations of the physical environment. Each proximity device may define an individual area (e.g., an individual safe zone). An overall area is defined as a collection of the individual areas. Proximity of the user to an outer perimeter of the overall area is detected. For instance, a central control unit receives the proximity data from the proximity devices based on a polling mechanism or an automatic reporting mechanism. In another illustration, no central control unit is used. Instead, the control is distributed among the proximity devices via peer-to-peer communication between the proximity devices. Regardless of the control configuration, the proximity of the user to the outer perimeter is determined from the proximity data of the proximity devices. If the user becomes too close, the central control and/or some or all of the proximity devices generate an indication of the proximity to the outer perimeter. The indication can be presented using different modalities by some or all of the proximity devices, the VR headset, or a combination of both. For instance, an audio speaker of a proximity device is activated to provide a loud beep. In addition, the VR headset receives the indication from the proximity device, plays a similar audio beep, and displays an overlay on a graphical user interface to warn the user. Examples of the networked proximity devices are further illustrated in FIGS. 11-14.

In the interest of clarity of explanation, a room and a couch are described as examples of a physical environment and of an object, respectively. However, embodiments of the present disclosure are not limited as such. Instead, the embodiments similarly apply to other indoor and outdoor physical environments and to other physical objects. An object can also include a user. In addition, a proximity device, a proximity sensor, a proximity apparatus, and a proximity system are used interchangeably herein unless context indicates otherwise.

FIG. 1 illustrates an example physical environment, where a wearable proximity device 110 provides awareness to a user 112 about proximity to an object 120. In this example, the physical environment is a room where the user 112 is located. The object 120 is a couch and can become a trip hazard for the user 112 if the user 112 is unaware of it. That can be the case when, for instance, the user 112 operates a VR headset 114. In particular, the user 112 becomes immersed in the presented virtual reality and less aware of physical objects in the room.

The wearable proximity device 110 is located on the user. As illustrated, the wearable proximity device 110 takes the form of a wristband that the user wears on his or her wrist. Other forms of the wearable proximity device 110 are also possible. For instance, the wearable proximity device 110 can be of any suitable form for attaching to an ankle or a clothing piece of the user 112, being carried in a clothing pocket or accessory, or attaching to the VR headset 114. In another illustration, the proximity device 110 is integrated with the VR headset 114.

In an example, the wearable proximity device 110 detects the proximity of the user 112 to the object 120. The detection can be continuous, at time intervals, or triggered by a tactile or verbal command from the user 112. The command can be entered directly at the wearable proximity device 110 or indirectly through the VR headset 114.

The proximity includes approximate distance, approximate direction, and/or a combination of approximate distance direction between the user 112 and the object 120. The distance and direction are approximate and not absolute. That is because, the actual measured proximity is from the wearable proximity device 110 and an outer surface of the object 120. In addition, the measurements include some measurement errors and approximations. Nonetheless, the proximity represent a proximity of acceptable accuracy (e.g., 75%, 80%, 90%, 95%, 99%, 99.9% or, accuracy otherwise known in the art or industry acceptable).

The wearable proximity device 110 can monitor the proximity over time. For example, the wearable proximity device maintains a motion vector as a function of proximity over time. As the user 112 moves around the environment, the user's proximity to the object 120 changes.

As illustrated in FIG. 1, at one time, the user 112 is at a proximity 116 away from the object 120. That proximity 116 includes a first distance and a first direction. At that time, the wearable proximity device 110 detects that the user 112 is not too close to the object 120 based on the proximity 116 such that the object 120 is not a potential obstacle. Accordingly, the wearable proximity device 110 does not generate an indication of the proximity 116 (e.g., an alert) for presentation to the user 112. Alternatively, if an indication is generated (e.g., since the proximity data is already processed), the indication need not be presented to the user 112 unless the user 112 requests the indication. A user request can be initiated via a tactile or verbal command from the user 112. The command can be entered directly at the wearable proximity device 110 or indirectly through the VR headset 114.

At a second time, the user 112 has moved closer to the object 120. The corresponding proximity 118 includes a second distance and a second direction. At this time, however, the wearable proximity device 110 detects that the user 112 is too close to the object 120 based on the proximity 118 such that the object 120 has become a potential obstacle. Accordingly, the wearable proximity device 110 generates an indication of the proximity 118 (e.g., an alert) for presentation to the user 112. The presentation can occur at the wearable proximity device 110, the VR headset 114, or both and can involve different presentation modalities. As illustrated in FIG. 1, the VR headset 114 displays an alert message 130 to the user 112.

In an example, an indication of a proximity is quantitative and includes any of the parameters of the proximity such as distance and/or direction. As such, the user 112 can perceive that he or she is away by a certain distance at a certain direction from object 120. In another example, an indication is qualitative and includes a warning or a flag that the object 120 is too close (or not), or that the object 120 is now a potential obstacle (or not). That type of indication can be supplemented with a direction derived from the proximity (e.g., "an object is too close and is to your right").

Various techniques are available to determine whether the object 120 has become a potential obstacle based on the user's proximity. One example technique uses the distance. If the distance is smaller than a threshold, the wearable proximity device 110 classifies that the object 120 has become a potential obstacle. Additionally or alternatively, the technique can use the direction. If the user is also moving in the direction of the object (while being too based on the threshold), only then the wearable proximity device 110 classifies the object 120 as a potential obstacle.

Various techniques are also available to define the threshold. In one example, the threshold is static and defined based on, for instance, the measurement accuracy of the wearable proximity device 110. In another example, the threshold is defined based on user input. For instance, the user 112 sets up a preference about stay-away distances from objects. The preference can be stored in a user profile local to the wearable proximity device 110 or remotely accessible to the wearable proximity device 110 from, for instance, the VR headset 114. In yet another example technique, the threshold is defined based on usage of the VR headset 114. For instance, certain video games or content necessitate little movement of the user 112 (e.g., a chess video game), whereas video games or content necessitate more movement (e.g., a sports video game). In the former case, the threshold can be defined as a large distance because the user 112 is not expected to move much. In the latter case, the threshold can be defined as a small distance because the user 112 is expected to need a larger space. In a further example technique, the threshold is dynamically computed based on the user's 112 proximity. For instance, if a motion vector is maintained, the user's 112 speed can also be tracked. The threshold can be a function of the speed. The higher the speed, the larger the threshold is to allow sufficient time for warning the user 112 of the potential obstacle and for the user 112 to react and avoid collision.

In an example, the wearable proximity device 110 is in data communication with the VR headset 114. The data communication can occur over a point-to-point short data network (e.g., one that used Bluetooth®) or over a local area network (LAN) or can be facilitated by a central computer, such as a desktop, a game console, or a server. The data communication enables multiple functions. For instance, the VR headset 114 receives, from the wearable proximity device 110, the indication about the user's 112 proximity to the object 120. Accordingly, the VR headset 114 presents information about the proximity to the user 112. In another illustration, user commands related to the functionalities of the wearable proximity device 110 can be entered at the VR headset 114 and transmitted to the wearable proximity device 110. In yet another illustration, the processing of proximity data can be offloaded to the VR headset 114 (and/or the central computer). In this case, the wearable proximity device 110 captures and sends the proximity data to the VR headset 114 (and/or the central computer) that, in turn, performs the proximity detection and alerting.

Although FIG. 1 illustrates a single wearable proximity device 110, a larger number of such devices can also be operated per user. Generally, using multiple wearable proximity devices can increase the accuracy of the proximity monitoring and, thus, the fidelity of the proximity sensing and alerting. In this case, each wearable proximity device can transmit an identification signal such that the other wearable proximity devices 110, the VR headset 114, and/or the central computer identify it. Proximity data can be exchanged between the wearable proximity devices or sent to the VR headset 114 and/or central computer over a data network. Each of the wearable proximity devices, a single wearable proximity device (e.g., one set as a "master device,"), the VR headset 114, and/or the central computer process the proximity data to measure the proximity of the user 112 to the object 120 (and other objects in the environment) and generate proximity alerts.

Figure 2:
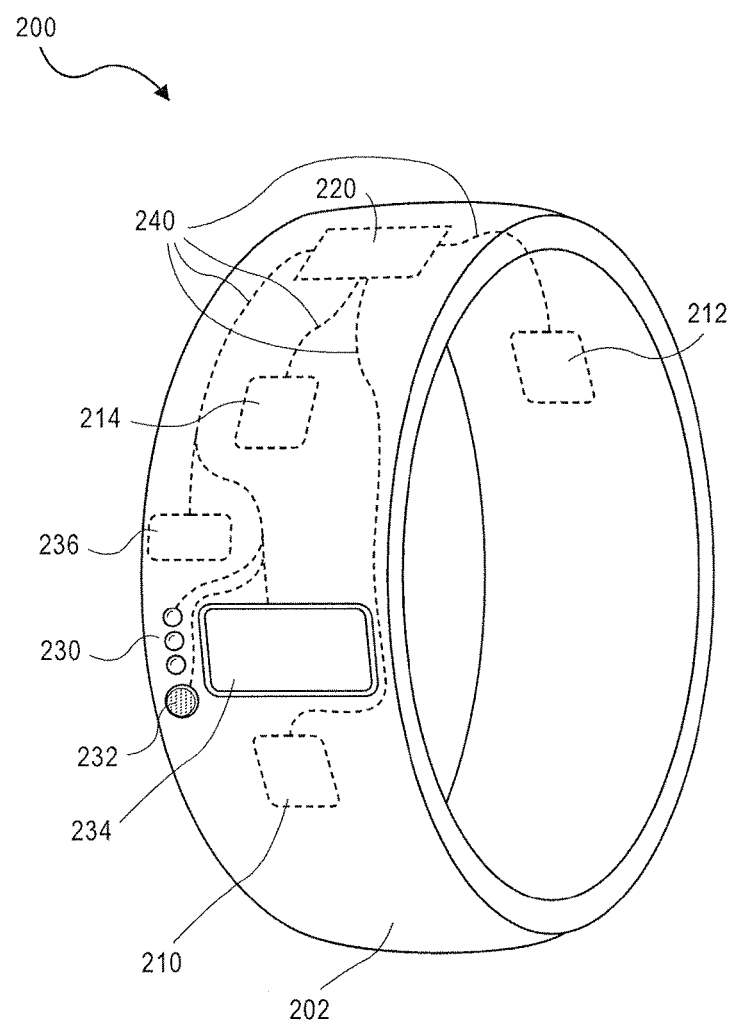
FIG. 2 illustrates example components of a wearable proximity device according to an embodiment of the present disclosure.

FIG. 2 illustrates example components of a wearable proximity device 200. Generally, the wearable proximity device 200 includes a housing 202 that houses, attaches, or holds multiple components. The housing 202 can be made of different materials, such as plastic, metal, glass, leather, carbon fiber, or other materials. The housing 202 can also be of different shape, size, or form or can include different interfaces for attaching the wearable proximity device 200 to a user, a clothing piece or an accessory of the user, or to a VR headset. FIG. 2 illustrates an example wristband-like housing 202 suitable to be worn on a user's wrist.

In an example, the housing 202 includes a number of proximity sensors. Depending on the type of the proximity sensor and the material of the housing 202, the proximity sensor may be housed inside or on a surface of the housing 202. Similarly, the housing 202 may include an aperture for proper functioning of the proximity sensor.

Generally, the higher the number of proximity sensors, the more capable and/or more accurate the wearable proximity device 200 is with respect to proximity sensing. For example, a single proximity sensor allows sensing distance. In comparison, three or more proximity sensors allow also sensing direction and generating motion vectors. Likewise, a single proximity sensor senses proximity in a certain directional field (e.g., about a one-hundred eighty degree field directed normal from the user when the user wears the housing 202). In comparison, a plurality of proximity sensors increases the size of the directional field (e.g., two or more proximity sensors result in a three-hundred eighty degree around the user when the user wears the housing 202). As illustrated in FIG. 2, the housing 202 houses three proximity sensors: a first proximity sensor 210, a second proximity sensor 212, and a third proximity sensor 214.

In addition, the proximity sensors can but need not be of the same type. Different sensor types are available and include, for example, radio frequency (RF), infrared (IR), acoustic, and LiDAR proximity sensors. Generally, a proximity sensor includes one or more of an antenna, emitter, transmitter, receiver, transceiver, signal processor, and/or other components to transmit, receive, and process a signal and sense proximity. The signal can be of different types including, for example, RF, IR, acoustic, and laser light signals. A signal is transmitted. The transmitted signal is reflected from an object. The reflected signal is received. The proximity to the object is detected in part from the strength of the reflected signal (e.g., relative to the transmitted signal), a time of flight of the signal (transmitted and received), and/or frequency of the reflected signal (or other measurable Doppler effects).

In an illustration, an RF proximity sensor is used. The proximity sensor includes a transmitter, a receiver, and a millimeter wave antenna electronically coupled with the receiver. The antenna has a main lobe directed normally from the user when the user wears the housing 202. The transmitter transmits a transmitted signal as a pulse. The receiver receives a reflected signal. A time of flight of the transmitted and reflected signals is measured. The proximity is calculated from the measured time of flight.

In an example, the housing 202 includes presentation components for presenting proximity indications to a user according to different presentation modalities. The presentation components include, for example, a set of lights 230, an audio speaker 232, a display 234, and a vibrating unit 236.

In an example, the housing 202 also houses a central controller 220. For example, the central controller 220 is located within the housing 202. Generally, the central controller 220 provides control functions over some of the components of the wearable proximity device 200. The central controller 220 can also be configured to process proximity data sensors by the proximity sensors 210, 212, and 214 and generate indications of proximity for presentation. In an example, the central controller 220 is implemented as a microprocessor that includes a memory for storing computer-readable instructions. Data exchange between the central controller 220 and the proximity sensors and presentation components involves signal cables 240. The signal cables 240 connect the central controller 220 with the proximity sensors and the presentation components.

The wearable proximity device 200 includes other components not shown in FIG. 2 in the interest of clarity of explanation. However, these components can also be housed in the housing 202 and include, for instance, an on/off button, a button to pair the wearable proximity device 200 with a VR headset, user input buttons for entry of user commands, a button to dismiss a proximity alert message, a power source, transmitters and receivers for data communication with the VR headset, and other components.

Figure 3:
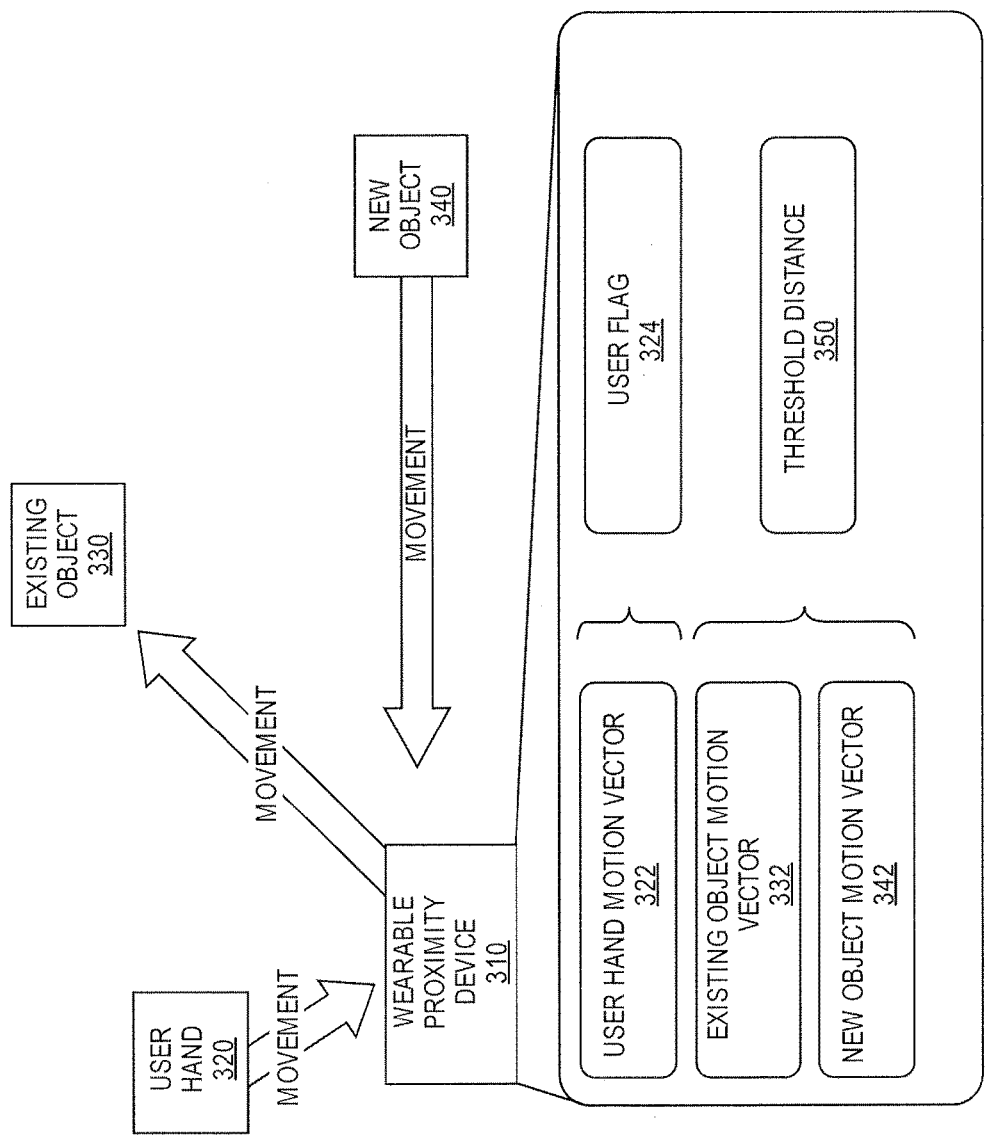
FIG. 3 illustrates example operations of a wearable proximity device according to an embodiment of the present disclosure.

FIG. 3 illustrates example operations of a wearable proximity device 310. Generally, the operations include sensing proximity to an object. The object can be remote to a user wearing the wearable proximity device 310 and can include a static physical object or a dynamic physical object (e.g., a remote controlled car, a pet, or another user). If the wearable proximity device 310 is attached to a point on the user (the user's wrist), other points of the user (e.g., the user's body, the user's opposite hand, etc.) are in proximity and/or can become in close proximity to wearable proximity device 310 (e.g., by moving the attachment point and/or these points). In this case, the wearable proximity device 310 senses the proximity and can generate a false warning of a potential collision. To avoid such false positives, operations of the proximity device also include detecting whether an object belongs to the user (e.g., is a point on the user) or not. These operations are described herein next.

As illustrated in FIG. 3, the wearable proximity device 310 senses the proximity of a user hand 320, an existing object 330 (e.g., one that is currently present in the physical environment), and a new object 340 (e.g., one that was not previously detected). Different movements occur over time. For instance, the user moves the user hand 320 closer to the wearable proximity device 310. The user and, thus, the wearable proximity device 310 also move closer to the existing object 330. Finally, the new object 340 moves closer to the wearable proximity device 310. The various movements result in different proximities over time. These proximities are analyzed to generate proximity indications. For example, the wearable proximity device 310 classifies (e.g., flags) the user hand 320 as belonging to the user, thereby avoiding false positives. On the other hand, the existing object 330 represents a potential obstacle (e.g., a furniture piece presenting a trip hazard). Likewise, the new object 340 represents a potential obstacle (e.g., a pet that moves close to the user). When the distance between the wearable proximity device 310 and any of these two objects becomes too small (e.g., smaller than a threshold), a proximity alert is generated.

In an example, the wearable proximity device 310 operates a number of proximity sensors to sense the distance and direction to each of the user hand 320, the existing object 330, and the new object 340 (upon detection such as when the new object 340 moves within the sensing range of the proximity sensors). For each of these objects, the wearable proximity device 310 generates a motion vector from the proximity data collected by the proximity sensors. A motion vector tracks respective distance and direction as function of time. As such, a user hand motion vector 322 is generated for the user hand 320, an existing object motion vector 332 is generated for the existing object 330, and a new object motion vector 342 is generated for the new object 340. These objects are described for illustrative purposes. Other numbers and types of objects are also possible.

In an example, the wearable proximity device 310 determines whether an object belongs to a user or not based on the respective motion vector. This includes classifying the object as either belonging to the user or not according to rules that are applied to the vector motion. The classification need not recognize the object. For instance, a rule specifies conditions associated with parameters of a user hand. If the motion vector indicates that since the time the wearable proximity device 310 was turned on or that over time the object was always close to the wearable proximity device 310 (e.g., not further than five feet nine inches away—corresponding to an average arm span of a male user) and that the object has moved within a certain range (e.g., less than the five feet nine inches) during that time frame, the object belongs to the user. If the motion vector does not meet these conditions and conditions of other rules, the object does not belong to the user. These rules can be stored locally or can be remotely accessible to the wearable proximity device 310.

Hence, the wearable proximity device 310 classifies the user hand 320 as belonging to the user and generates a user flag 324 (or some other indication) of this classification. In this case, the wearable proximity device 310 does not generate a proximity alert for the user hand 320. In contrast, the existing object 330 and the new object 340 are classified as not belonging to the user (or, alternatively, not classified as belonging to the user). In this case, the wearable proximity device 310 further processes the respective motion vectors to generate proximity alerts. For instance, the wearable proximity device 310 compares the distances from the motion vectors 322 and 342 to a threshold distance 350. In addition, the wearable proximity device 310 determines whether the directions from the motion vectors 322 and 342 indicate that movement is in the direction of the two objects 330 and 340.

Although FIG. 3 illustrates the use of a vector motion, the embodiments described herein are not limited as such. Instead, other techniques are possible to classify whether an object belongs to a user or not. For example, the user can wear multiple wearable proximity devices. Such devices can be located at different points of the user (e.g., on the body, on the wrists, the ankles, etc.). Each wearable proximity device transmits an identification signal. As such, if a proximity sensor senses another object, the proximity sensor (or a VR headset or central computer) can check whether the object is associated with one of the identification signals. If so, the object is classified as belonging to the user.

Figure 4:
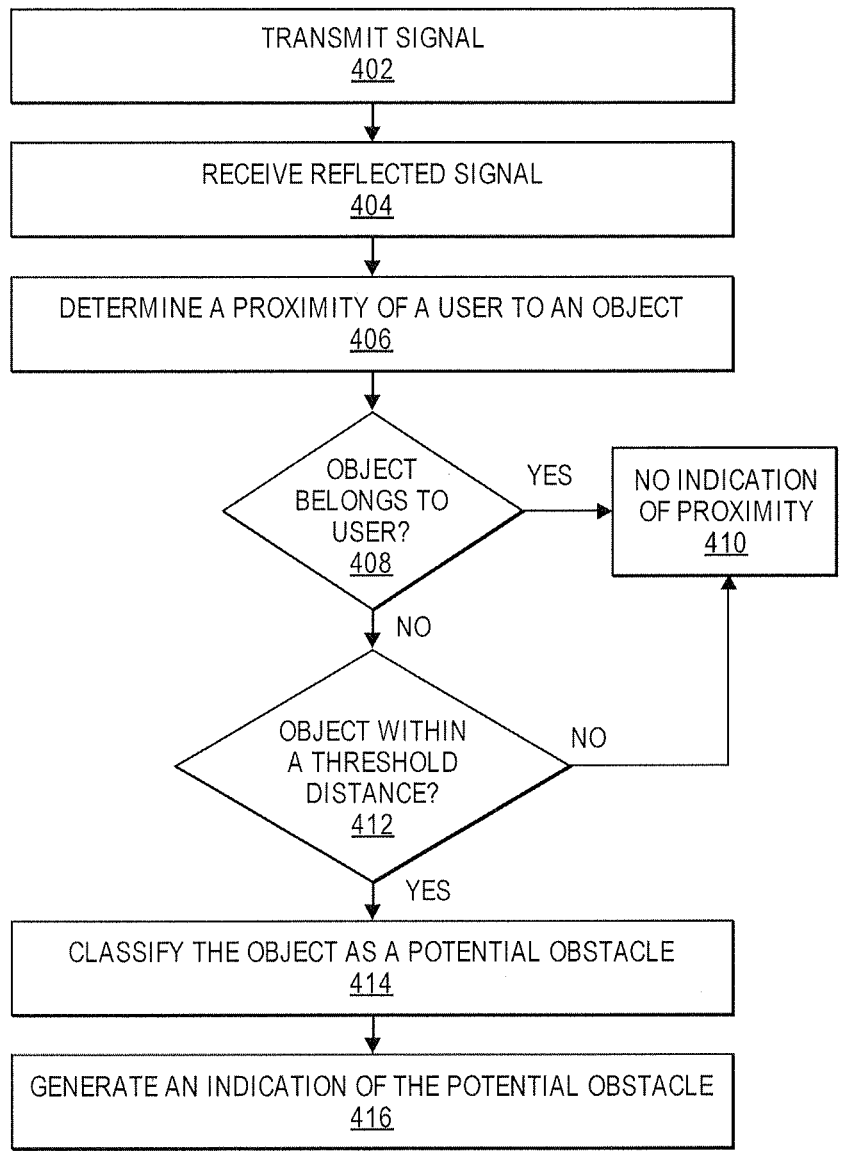
FIG. 4 illustrates an example flow for operating a wearable proximity device according to an embodiment of the present disclosure.

FIG. 4 illustrates an example flow for operating a wearable proximity device. A user wears the wearable proximity device. The wearable proximity device is used to sense proximity of the user to an object based on a proximity signal. A processor is illustrated as performing operations of the flow. For example, the processor executes computer-readable instructions stored in a memory coupled to the processor. The computer-readable instructions include instructions for performing the operations. In an example, the processor is a component of the wearable proximity device. In another example, proximity data sensed by the wearable proximity device is sent to another computing device, such as a VR headset or a central computing device. In this example, the processor is a component of the computing device such that the proximity sensing is distributed between the wearable proximity device and the computing device. In addition, although the operations are illustrated in a particular order, some of the operations can be re-ordered or omitted. In the interest of clarity of explanation a single object and a single wearable proximity device are illustrated. However, the operations similarly apply to a larger number of objects and/or wearable proximity devices.

In an example, the flow includes an operation 402, where a signal is transmitted. For instance, the processor controls a rate of transmission of an RF, IR, acoustic signal, or laser light signal from a proximity sensor of the wearable proximity device. A transmitter of the proximity sensor transmits a transmitted signal in a direction outward from the user.

In an example, the flow includes an operation 404, where a reflected signal is received. For instance, the processor controls a receiver of the proximity sensor. The receiver receives the reflected signal. The reflected signal corresponds to a reflection of the transmitted signal from the object.

In an example, the flow includes an operation 406, where a proximity of the user to the object is determined. For instance, the processor analyzes the transmitted signal and/or the reflected signal to determine distance and, as applicable, direction. The distance can be derived from the strength of the reflected signal (e.g., the relative strength in comparison to the strength of the transmitted signal), a time of flight of the signal (transmitted and received signals), and/or frequency of the reflected signal (or other measurable Doppler effects). When the wearable proximity device includes multiple proximity sensors (and/or wearable proximity devices are used), the direction can be derived using triangulation techniques.

In an example, the flow includes an operation 408, where a determination is made as to whether the object belongs to the user. For instance, the processor generates a motion vector for the object. Rules are applied to the motion vector to classify the object as either belonging to the user or not. In another illustration, the processor determines if an identification signal is associated with the object. The identification signal identifies another wearable proximity devices located on the object. If so, the processor classifies the object as belonging to the user.

In an example, the flow includes an operation 410, where no indication of proximity for presentation to the user is generated. The operation 410 typically follows a determination at operation 408 that the object belongs to the user. Although the proximity to the object is computed, the processor need not automatically generate an alert (or some other indication) for presentation to the user, thereby avoiding false positives. However, if a user command is received for such an alert, the processor generates the indication. In this case, the indication includes the distance and direction to the object.

In an example, the flow includes an operation 412, where a determination is made as to whether the object (or, equivalently, the user) is within a threshold distance of the user (or, equivalently, the object). The operation 412 typically follows a determination at operation 410 that the object does not belong to the user. Operation 412 represents sensing whether the object and the user are too proximate to each other. For instance, the processor compares the distance to the threshold distance. If the distance is smaller than the threshold distance, the proximity may be too close. Otherwise, there is no risk of collision and operation 410 is typically followed. In addition, the processor determines whether the direction from the motion vector indicates a movement of the object towards the user, or vice versa. If the movement is on a collision course, the proximity may be too close. Otherwise, there is no risk of collision and operation 410 is typically followed.

In an example, the flow includes an operation 414, where the object is classified as a potential obstacle. The operation 414 typically follows a determination at operation 412 that the proximity is too close (e.g., based on distance and/or direction). For instance, the processor flags (or uses some other identifier to identify) the object as the potential obstacle. The user and the object could collide if the user does not adjust his or her movement.

In an example, the flow includes an operation 416, where an indication of the potential obstacle (or, equivalently, potential collision or contact) is generated. For instance, the processor generates the indication as an alert. The alert includes some of the proximity parameters, such as the distance and/or the direction. The processor causes a presentation of the indication at the wearable proximity device and/or the VR headset. For example, the processor activates a vibrating unit to vibrate, an audio speaker to play audio, a light to emit a certain color, or a display to render a message at the wearable proximity device. Additionally and/or alternatively, the VR headset receives the indication and overlays a warning message and/or plays audio to the user about the potential obstacle or collision.

Figure 5:
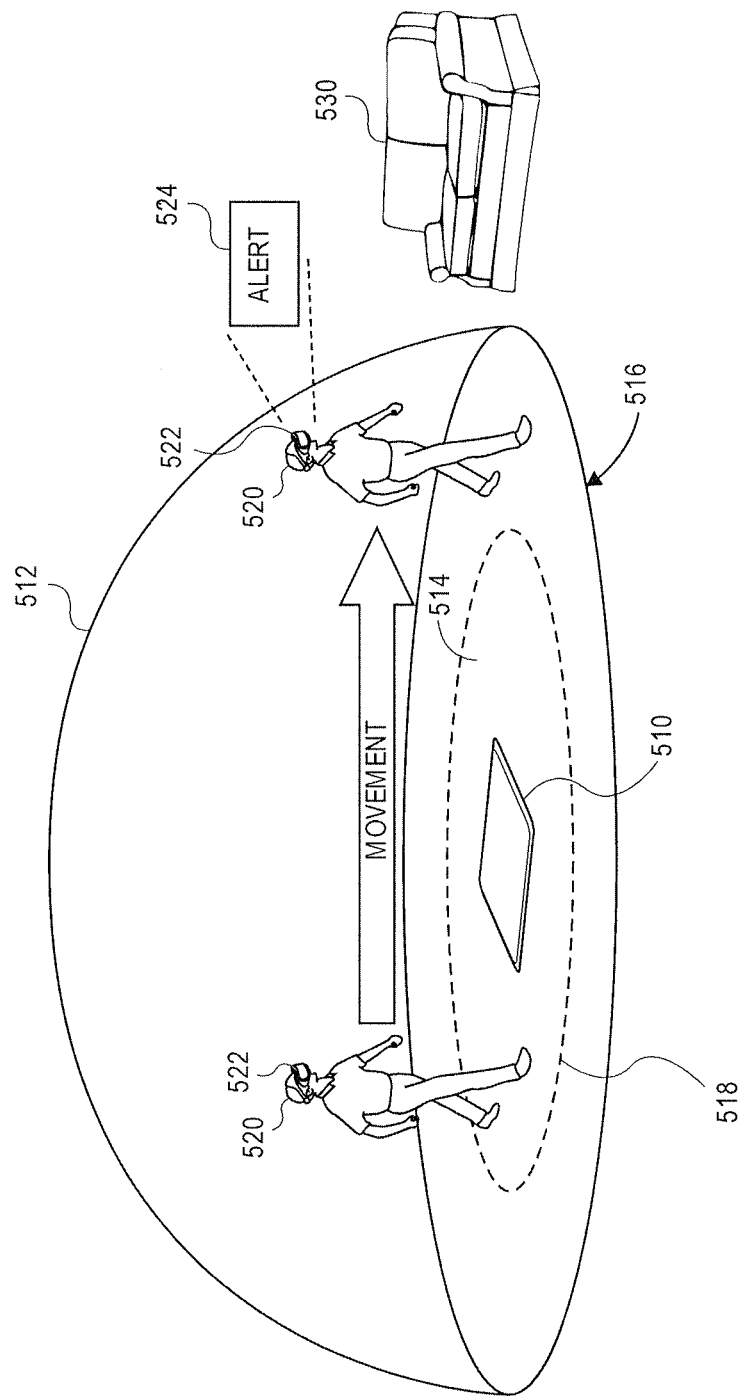
FIG. 5 illustrates another example of a proximity device according to an embodiment of the present disclosure.

FIG. 5 illustrates another example of a proximity device 510. A user 520 need not wear the proximity device 510. Instead, the proximity device 510 is located in a physical environment independently of the user 520, such as being located on the ground, on a piece of furniture, on a gaming console, or on a ceiling. If located on the ground, the proximity device 510 can have a low profile or be of a small size such that it is not a tripping hazard to the user 520. The proximity device 510 defines a volume 512 within the physical environment within which movement of the user 520 can be monitored. A ground footprint of the volume 512 defines an area 514 for ground movement. A perimeter 516 defines a boundary of the area 514, such as an outer boundary.

In an example, the area 514 represents a stay-in area, such as a safe zone. In this example, the area 514 is free of objects. As such, the user 520 can wear and operate a VR headset 522 safely within the perimeter 516 without a risk of collision with an object 530. The proximity device 510 monitors the movement of the user 520 within the area 514 and/or the proximity of the user 520 to the perimeter 516. As the user approaches the perimeter 516, the proximity device 510 generates an indication of the proximity of the user 520 to the perimeter 516. The indication is presented to the user using different presentation modalities via the proximity device 510, the VR headset 522, or both the proximity device 510 and the VR headset 522.

In an example, the proximity is detected based on a threshold. The threshold represents a threshold distance between a location of the user to the closest point of the perimeter 516. FIG. 5 illustrates an inner perimeter 518 as a boundary that represents the threshold distance. Once the user 520 crosses that boundary (e.g., becomes located between the inner perimeter 518 and the perimeter 516 or, equivalently, the user's 520 distance to the perimeter 516 becomes smaller than the threshold), the proximity device 510 generates the indication of proximity to the perimeter 516. A timely alert (or some other form of indication) is presented to and informs the user 520 that he or she is about to leave the area 514 (e.g., the safe zone), thereby allowing the user to adjust and avoid leaving the area 514 and potentially colliding with objects located outside of the area 514. For instance, the VR headset 522 displays an alert 524 to the user.

Different techniques are available to define the threshold. As described herein above the threshold can be statically or dynamically defined based on a number of factors. These factors include measurement accuracy, user preference, usage of the VR headset 522, and/or user's 520 proximity and speed.

The alert 524 provides different proximity information to the user 520. For example, the alert 524 informs the user 520 about the proximity to the perimeter 516. In addition, the alert advises about a certain movement for relocation to the area internal to the inner boundary 510. For example, based on the forward direction of the user 520 and a forward perimeter crossing, the proximity device 510 and/or the VR headset can set the alert 524 to advise the user to take a number of steps back. That number corresponds to the distance needed for the user to be within the inner area defined by the inner perimeter 518. A similar approach is possible for other types of perimeter crossing (e.g., back crossing, side crossing, etc.).

In addition to monitoring the movement and/or proximity of the user 520, the proximity device 510 monitors other objects entering the area 514. These other objects can include another user operating another headset. In this case, a proximity indication is also generated and presented to either or both users via the proximity device 510 and/or the respective VR headsets. Further, once within the area 514, the proximity device 510 monitors movements of both users and the proximity to each other. If the proximity falls below a threshold and there is a risk of collision (e.g., based on direction), the proximity device 510 also generates a proximity indication for presentation to either or both users.

In the case when a non-user object enters the volume 512 (e.g., a remote controlled drone flying in), the proximity device 510 generates an entry indication for presentation to the user 520. The proximity device 510 also monitors the user-to-object proximity to generate a proximity indication for presentation to the user 520.

The area 514 need not be a stay-in area. Instead, the area 514 can represent a stay-out area. In this example, the proximity device 510 monitors the proximity of the user 520 to perimeter 516. If the user 520 moves towards the area 514 within a threshold distance (e.g., a distance represented as an outer perimeter relative to the perimeter 516), the proximity device generates a proximity indication for presentation to the user 520 (and, to other users currently in the area 514 as applicable).

In another example, the area 514 includes a number of stay-in and stay-out sub-areas. As such, the proximity device 510 monitors whether the user 520 is about to leave a stay-in sub area and/or about to enter a stay-out area. Proximity indications are accordingly generated. To illustrate, a sub-area immediately around the proximity device 510 (e.g., within a one foot radius) is defined as a stay-out sub-area. The remaining portion of the area 514 is defined as a stay-in sub-area. This enables warning the user 520 when approaching the proximity device 510, thereby avoiding collision between the user 520 and the proximity device 510.

As illustrated in FIG. 5, the volume 512 is defined as a semi-spherical, dome-like geometry. However, other geometries are also possible and depend on the proximity sensing capabilities of the proximity device 510, objects in the physical environment, and/or user preferences. For instance, any of the size or shape of the area 514 can be changed.

In an example, hardware and/or software capabilities of the device 510 set the size and shape. For instance, the positioning of sensor antennas or emitters in a certain directional field (e.g., one-hundred degree or three-hundred sixty degree) contributes to the shape. The strength and type of transmitted waveforms contribute to the size. Such features can be coupled to the device's software. For instance, the software ignores signals reflected from a particular range of angles or having particular time of flight, strength, or Doppler effects. Thus, the combination of hardware and software can define particular shapes and sizes for the area 514. In an example, the proximity device 510 can include a mode button that enables the user 520 to select any of the supported shapes or sizes. Information about the selectable modes can be printed next to the mode button, displayed on a display of the proximity device 510, or transmitted from the proximity device 510 to the VR headset 522 for presentation to the user 520.

In another example, the perimeter 516 of the area 514 is a function of the objects and/or user preference as further illustrated in the next figures. Briefly, the proximity device 510 detects a first location and a second location. A line that connects these two locations defines a portion of the perimeter 516. In an illustration, each location corresponds to an object that the proximity device 510 detects during a calibration or set-up phase. In another illustration, each location corresponds to a location of the user 520 during the calibration or set-up phase.

Once the area 514 is defined, proximity of the user 520 (and other users and objects) is tracked over time with respect to perimeter 516 (and, similarly, the inner perimeter 518). In an example, the proximity device 510 is in data communication with the VR headset 522. The data communication can occur over a point-to-point short data network (e.g., one that used Bluetooth®) or over a local area network (LAN) or can be facilitated by a central computer, such as a desktop, a game console, or a server. The data communication enables multiple functions. For instance, the VR headset 522 receives proximity indications (and, as applicable entry indications) from the proximity device 510. In another illustration, user commands related to the functionalities of the proximity device 510 can be entered at the VR headset 522 and transmitted to the proximity device 510. In yet another illustration, the processing of proximity data can be offloaded to the VR headset 522 (and/or the central computer). In this case, the proximity device 510 captures and sends the proximity data to the VR headset 522 (and/or the central computer) that, in turn, performs the proximity detection and alerting.

Figure 6:
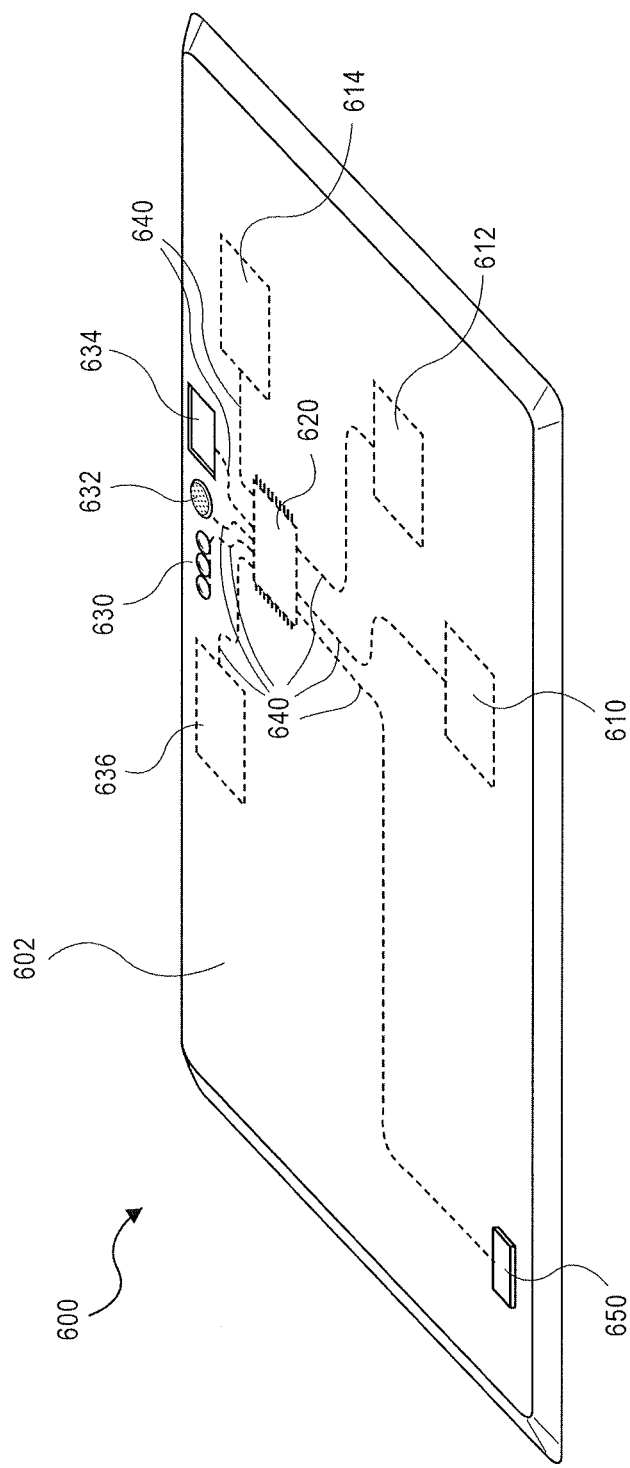
FIG. 6 illustrates example components of a proximity device according to an embodiment of the present disclosure.

FIG. 6 illustrates example components of a proximity device 600. Some of the components are similar to the components of the wearable proximity device 200. The similarities are not repeated herein. For example, the proximity device 600 includes proximity sensors 610, 612, 614, a central controller 620, a set of lights 630, an audio speaker 632, a display 634, a vibrating unit 636, and signal cables 640. These components are similar to the proximity sensors 210, 212, 214, the central controller 220, the set of lights 230, the audio speaker 232, the display 234, the vibrating unit 236, and the signal cables 240, respectively.

In addition, the proximity device 600 includes a housing 602 that houses these and other components. The housing 602 can include different interfaces for attaching the proximity device 600 to a location in the environment (e.g., to the ground, a piece of furniture, a gaming console, and a ceiling). The housing 602 can also be made of different materials, such as plastic, metal, glass, leather, and/or carbon fiber.

Depending on the location where the proximity device 600 is designed to be mounted, the housing 602 can have a specific shape, size, or form. For instance, if the proximity device 600 is designed to be laid down on the ground, the housing 602 has a small profile with angled edges such that proximity device 600 does not become a potential trip hazard for a user. Other configurations to minimize such a risk are also possible. For example, the housing 602 includes a soft cushion, is a collapsible cone, is spring-mounted on a base, and/or includes a motorized unit that moves the proximity device 600 away from the user upon a detection of the user's proximity to the proximity device 600.

In an example, the housing 602 also houses a mode button 650. The mode button 650 allows the user to select a shape and/or size of an area for proximity monitoring. A signal cable 640 connects the mode button to the microprocessor 620.

The wearable proximity device 600 includes other components not shown in FIG. 6 in the interest of clarity of explanation. However, these components can also be housed in the housing 602 and include, for instance, an on/off button, a button to pair the proximity device 600 with a VR headset, user input buttons for entry of user commands, a button to dismiss a proximity alert message, a power source, transmitters and receivers for data communication with the VR headset, and other components.

Figure 7:
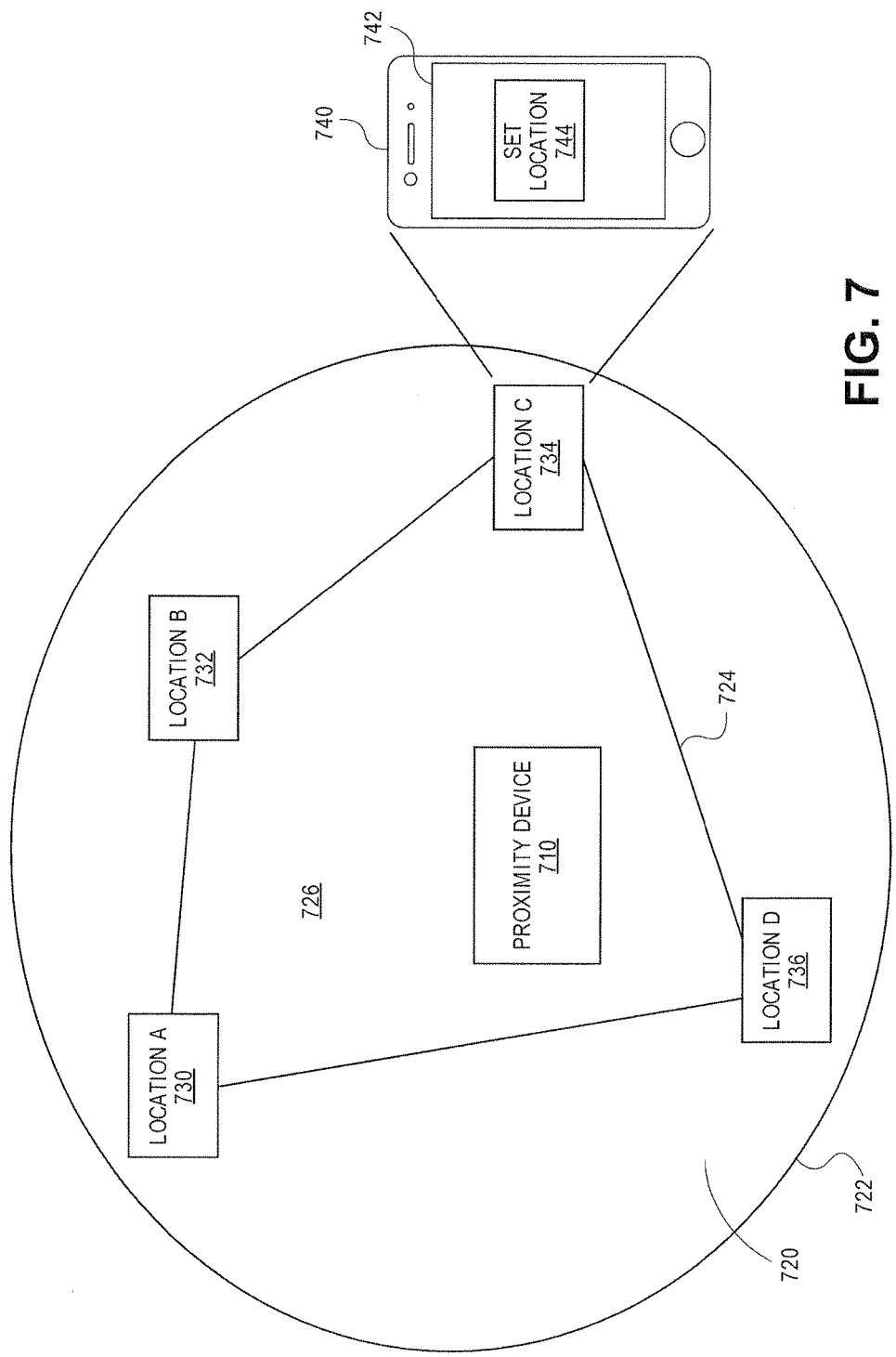
FIG. 7 illustrates an example of defining a perimeter of an area within which proximity is monitored according to an embodiment of the present disclosure.

FIG. 7 illustrates an example of defining a perimeter of an area within which proximity is monitored. FIG. 7 is a top view that shows a proximity device 710 capable of sensing proximity within a boundary 722. The area inside the boundary 722 represents a potential monitoring area 720. The actual monitored area 726 falls within the potential monitoring area 720 and is defined by a perimeter 724. Whereas the potential monitoring area 720 depends on the proximity-related capabilities of the proximity device 710, the actual monitored area 726 also depends on objects in the physical environment and/or user preference. The dependency on the object is described herein next, followed by a description of the dependency on the user preference.

In an example, there are a number of existing objects in the potential monitoring area 720. FIG. 7 illustrates four locations corresponding to four of such objects, although a larger or smaller number of objects and different locations are possible. A first location 730 corresponds to a first object. A second location 732 corresponds to a second object. A third location 734 corresponds to a third object. And a fourth location 736 corresponds to a fourth object.

In a calibration phase, the proximity device 710 transmits signals and receives reflected signals to detect proximities of these objects (e.g., distances and directions to the respective four locations). As such, the proximity device 710 identifies the locations 730, 732, 734, and 736. The perimeter 724 is defined as a function of these locations and/or the boundary 722. For instance, the proximity device 710 represents the locations as points and connects the points to form the perimeter 724. In another example, the proximity device 710 sets or defines a stay-out sub-area around each location and defines the actual monitored area 726 as the potential monitoring area 720 minus the stay-out sub-areas. Defining a stay-out sub-area can be based on a threshold distance. For instance, the stay-out sub-area is an area having a particular radius from the center or some other point of the respective location. The radius can be equal to the threshold distance. The threshold distance can be the same threshold distance subsequently used for monitoring the user's proximity to the perimeter 724.

In an example of the calibration that relies on the user preference, the locations 730, 732, 734, and 736 correspond to locations of the user instead of objects. In this example, the user moves within the potential monitoring area 720 and stops at each of the four locations 730, 732, 734, and 736. Once at a desired location (e.g., one of the four locations 730, 732, 734, and 736), the user operates a portable device 740 to mark the location. The portable device 740 runs an application that displays a mark button 744 on a screen 742. As illustrated, the mark button 744 indicates to the user that the desired location can be set. The portable device 740 is in data communication with the proximity device 710 over a point-to-point or a LAN network. The proximity device 710 receives the user's selection of the mark button 744. Accordingly, the proximity device 710 transmits signals and receives signals reflected from the user, while the user is at that desired location. The proximity of the user (e.g., distance and direction) is then determined and represents a desired location. The proximity device 710 marks the desired location as a point. The marking process is repeated across the four locations 730, 732, 734, and 736. Upon completion, the proximity device connects the resulting points to form the perimeter 724.

The above example of user preference-based calibration need not use a portable device 740. Instead, the VR headset can be similarly used. However, in this case, the VR headset is not worn by the user such the user can properly walk around the potential monitoring area 720. In yet another illustration, the user provides oral commands to the proximity device 710 once the user arrives at each of the desired locations. The proximity device 710 interprets an oral command as a user selection of a desired location.

Once the area is defined (e.g., the actual monitored area 726 as illustrated in FIG. 7), different techniques are available to monitor the proximity of a user to a perimeter of the area. An example technique relies on data communication between a proximity device and a VR headset. In this example, the proximity device communicates with the VR headset over a short range, low energy wireless communication network, such as one that implements Bluetooth®. The threshold distance from the perimeter is mapped to a first signal strength of the signal used for the data communication. The perimeter is also mapped to a second signal strength of the signal. As such, once the strength of the signal falls in the range between two mapped values, the proximity device detects that the user has crossed the threshold distance and is in proximity of the perimeter. The proximity indication is generated and transmitted to the VR headset over the same data network or over a different one (e.g., LAN).

Other example techniques need not use the data communication. Instead and as illustrated in the next figures, these techniques involve using the reflected signal from the user to determine the proximity.

Figure 8:
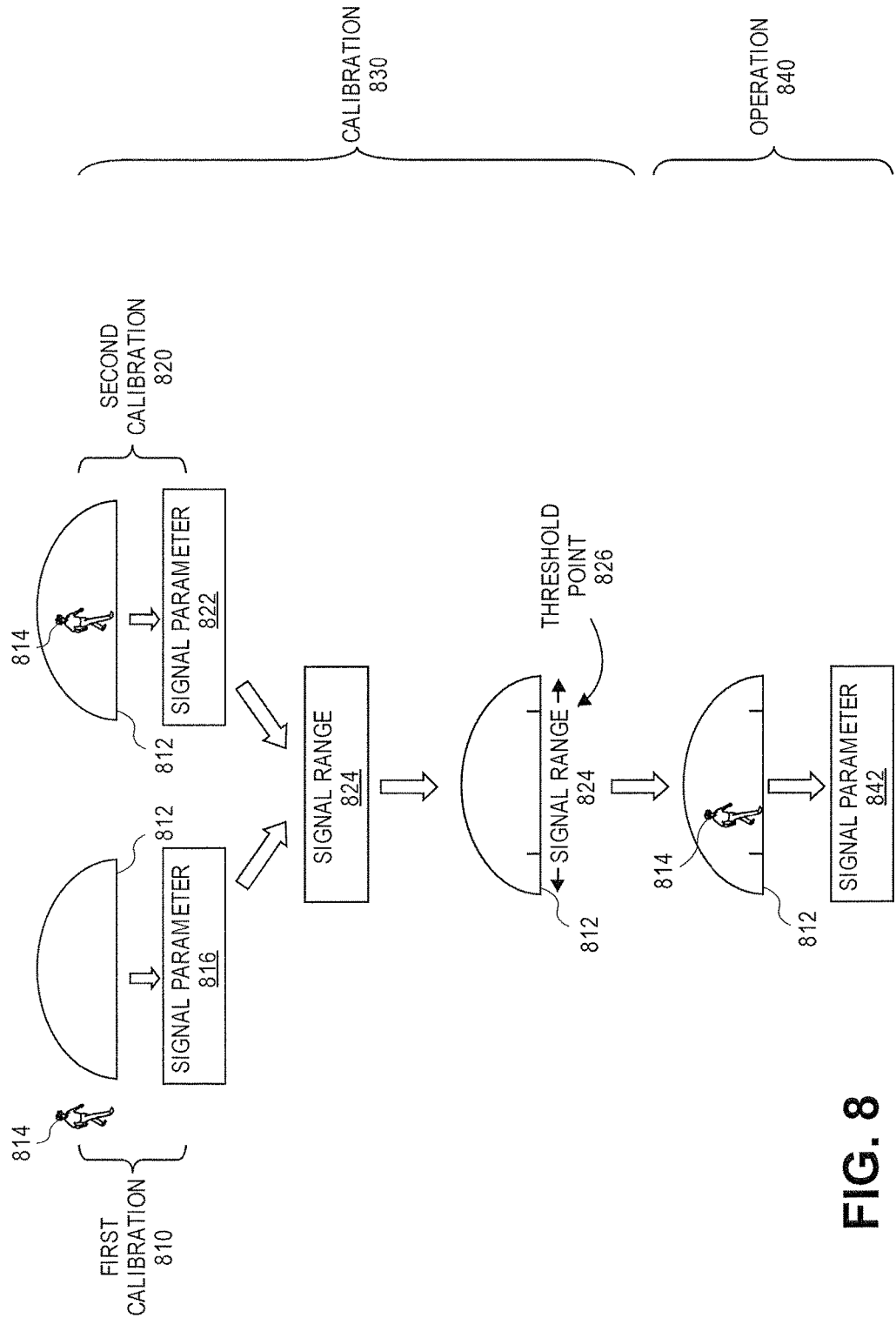
FIG. 8 illustrates an example of proximity monitoring that relies on a calibration of a proximity device with respect to an area within which proximity is to be monitored according to an embodiment of the present disclosure.

FIG. 8 illustrates an example of proximity monitoring that relies on a calibration 830 of a proximity device with respect to an area 812 within which proximity is to be monitored. Generally, the calibration 830 results in a signal range 824. A first end of the signal range 824 (e.g., the lower bound) corresponds to a user 814 being located outside of the area 812. A second end of the signal range 824 (e.g., the upper bound) corresponds to the user 814 being located in close proximity of the proximity device (e.g., at the center of the area 812). Proximity of the user 814 to a perimeter of the area 812 is monitored as a function of the signal range 824.

In an example, the calibration 830 includes multiple steps. In a first calibration 810, the user 814 is located outside of the area 812. The proximity device measures a signal parameter (shown as a first measured signal parameter 816). The signal parameter depends on the proximity-related capability of the proximity device. For instance, if RF signals are used, an electromagnetic field or a capacitance related parameter is measured. If IR signals are used, an IR spectroscopy-related parameter is measured. The first measured signal parameter 816 (e.g., the actual value) depends on the objects (if any) in the area 812.

In a second calibration 820, the user 814 moves closely to the proximity device. For instance, the user 814 stands over or around the proximity device. The proximity device measures the same signal parameter again (shown as a second measured signal parameter 822). Because of the user's 814 proximity, this measured signal parameter 822 (e.g., the actual value) represents the scenario where the user 814 is the closest to the proximity device.

Next, the proximity device maps a threshold distance to a threshold point 826 of the signal range 824. Generally, the threshold point 826 is close to the first end (e.g., 1%, 5% or some other percentage greater than the lower bound).

In operation 840, the proximity device measures the same signal parameter again (shown as a measured signal parameter 842). If the measured signal parameter 842 falls outside the first end of signal range 824, the user 814 is determined to have left the area 812. If the measured signal parameter 842 falls between the first end and the threshold point 826, the user 814 is determined to be in proximity of the perimeter. If the measured signal parameter 842 falls between the threshold point 826 and the second end of the signal range 824, the user is determined to be properly within the area 812. If the measured signal parameter 842 falls outside the second end, it is determined that a second object (e.g., another user) may have entered the area 812.

Figure 9:
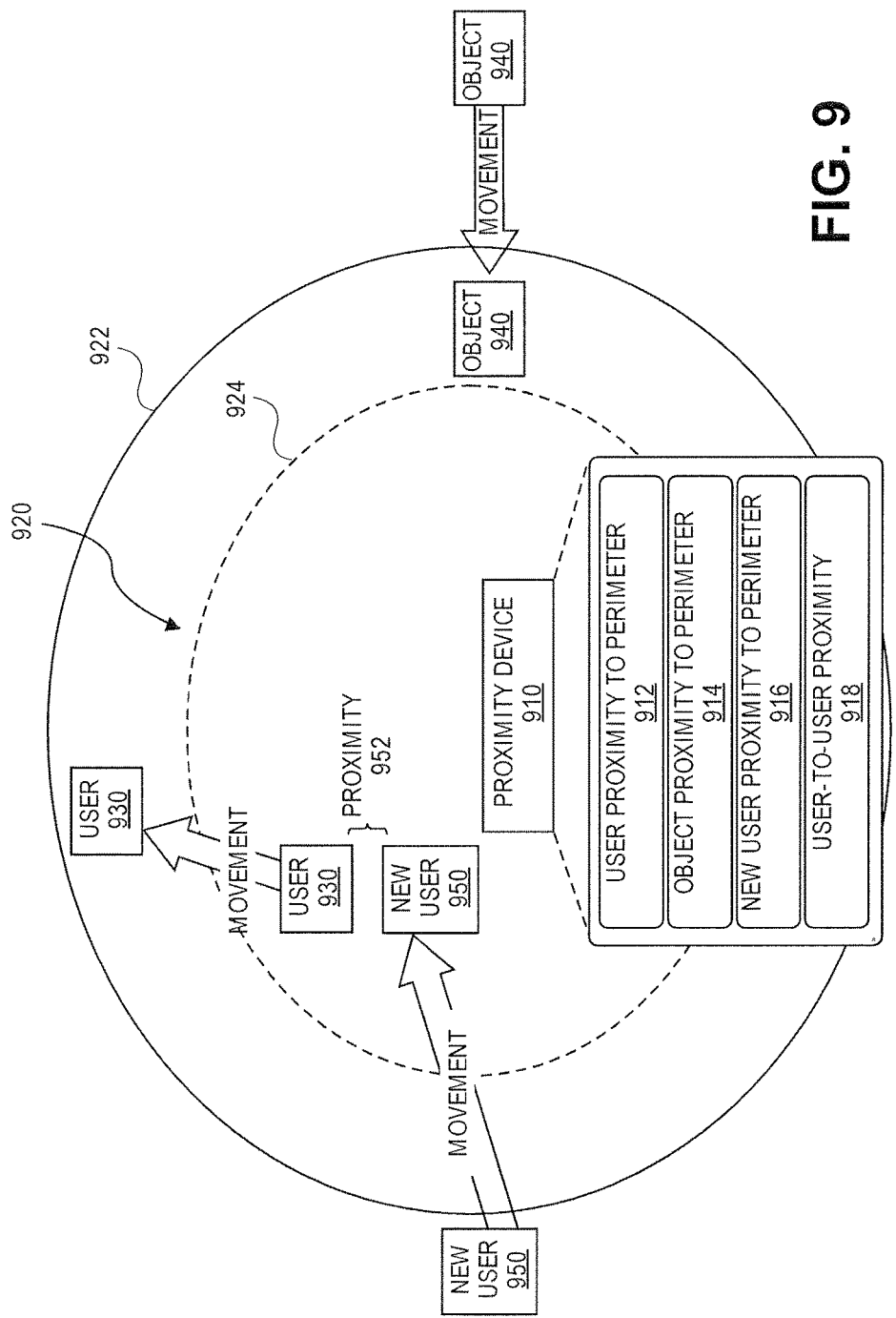
FIG. 9 illustrates another example of proximity monitoring of a user within an area based on a reflected signal from the user according to an embodiment of the present disclosure.

FIG. 9 illustrates another example of proximity monitoring of a user 930 within an area 920 based on a reflected signal from the user. FIG. 9 is a top view that shows a proximity device 910 capable of sensing proximity within the area 920. A perimeter 922 defines an outer boundary of the area 920. A threshold distance to the perimeter 922 is mapped to an inner perimeter 924. The proximity monitoring need not but can use a calibration, such as the calibration 810, the calibration 820, or the calibration 830 described in connection with FIG. 8.

In an example, there are a number of objects in the physical environment. FIG. 9 illustrates three objects and movements thereof, although a different number of objects and object types and/or different movements are possible. The user 930 is a first object located within the area 920 and moving outwards toward the perimeter 922. A second user (shown as new user 950) moves into the area 920 and gets close to the user 930 at one point in time. Another object 940 (e.g., a pet) crosses the perimeter 922 into the area 920.

In an example, the proximity device 910 operates a number of proximity sensors to sense the distance and direction to each of the user 930, the new user 950, and the object 940. For each of these objects, the wearable proximity device 910 generates a motion vector from the proximity data collected by the proximity sensors. A motion vector tracks respective distance and, as applicable, direction as function of time. The proximity device 910 analyzes an individual motion vector (e.g., applies a threshold to the respective distance) to detect proximity of the respective object to the perimeter 922. The proximity device 910 also analyzes two or more motion vectors collectively to determine potential collisions between the respective objects (e.g., if a derived distance and direction indicates a potential for collision). For instance, by analyzing the motion vectors of the user 930 and the new user 950, proximity 952 between the two users can be determined.

Hence, based on a motion vector of the user 930, the proximity device 910 tracks the proximity of the user 930 to the perimeter 922 (shown as user proximity to perimeter 912) or to any other objects within the area 920. For instance, if the distance of the user 930 indicates that the user crossed the inner perimeter 924 (e.g., the user's 930 distance to the perimeter 922 is less than a threshold distance), the proximity device 910 determines that the user 930 is too close to the perimeter 922 and generates a proximity indication. The proximity indication identifies the proximity to the perimeter 922 qualitatively (e.g., "too close") or quantitatively (e.g., the approximate distance to the perimeter 922). The proximity indication also identifies remedial steps based on the motion vector (e.g., recommends that the user 930 moves back in a direction opposite to the one of the motion vector).

Similarly, based on a motion vector of the object 940, the proximity device 910 identifies the proximity of the object 940 to the perimeter 922 (shown as object proximity to perimeter 914) or to any other objects within the area 920. For instance, once the object 940 is detected to be at a distance away from the proximity device 910 that is less than the total distance between the proximity device 910 and the perimeter 922, an entry indication is generated. The entry indication identifies the proximity (e.g., distance and direction) of the object 940 to the perimeter 922, the inner perimeter 924, the proximity device 910, and/or the user 930. Similarly, the proximity device 910 identifies the proximity of the new user 950 to the perimeter 922 (shown as new user proximity to perimeter 916), or to any other objects within the area 920, based on a motion vector of the new user 950.

In addition, the proximity device 910 identifies the proximity 952 between the user 930 and the new user 950 (also shown as user-to-user proximity 918) based on the motion vectors of the two users. If the proximity represents a risk of user-to-user collision (e.g., based on distance, direction, or speed), the proximity device generates a collision indication. The collision indication identifies the proximity 952 and remedial steps based on the motion vectors (e.g., recommends that the user 930 moves back in a direction opposite to the one of the motion vector, recommends the new user 950 to slow down, etc.).

Figure 10:
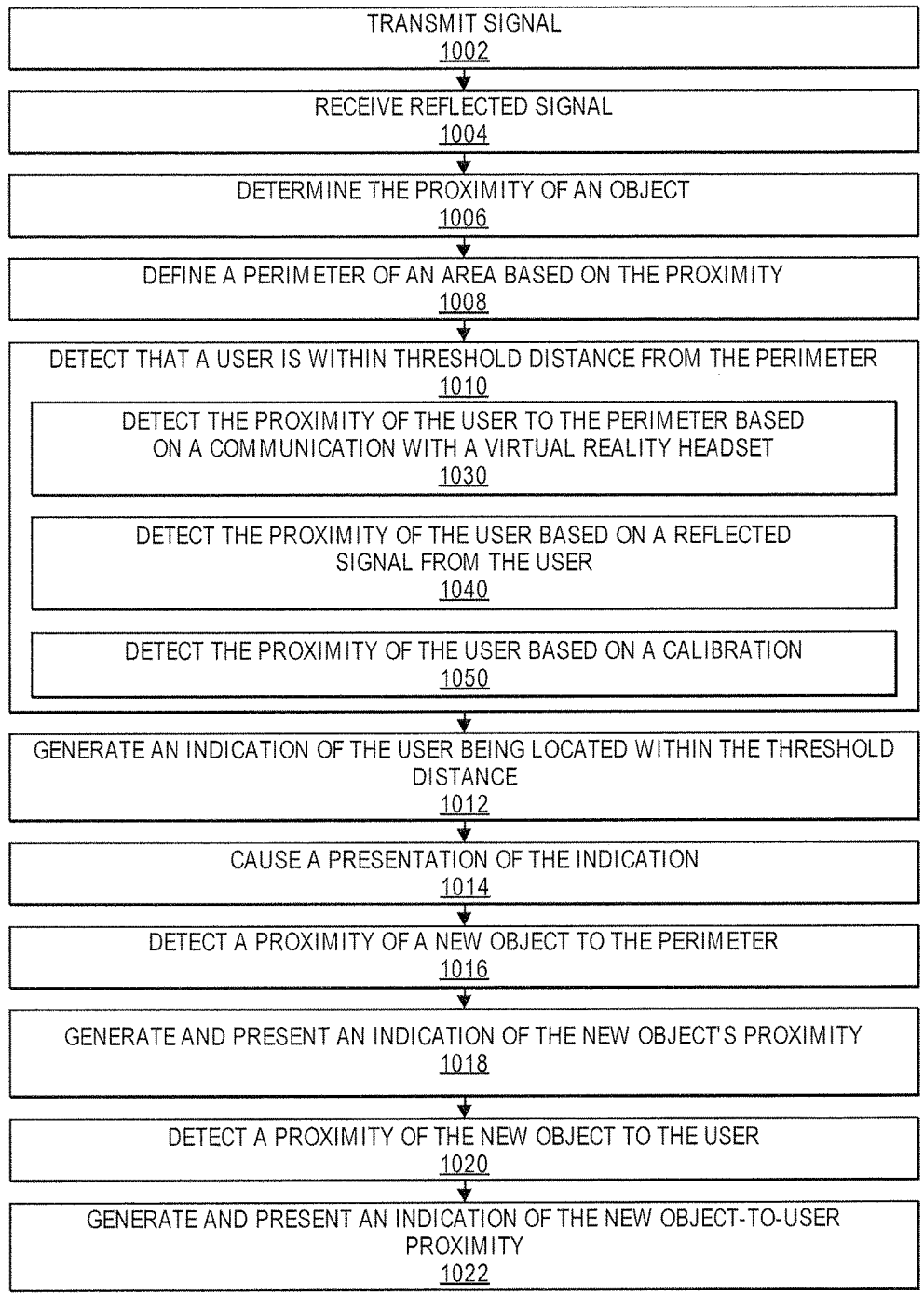
FIG. 10 illustrates an example flow for operating a proximity device according to an embodiment of the present disclosure.

FIG. 10 illustrates an example flow for operating a proximity device. The proximity device is used to sense proximity of a user to a perimeter of an area in a physical environment. A processor is illustrated as performing operations of the flow. For example, the processor executes computer-readable instructions stored in a memory coupled to the processor. The computer-readable instructions include instructions for performing the operations. In an example, the processor is a component of the proximity device. In another example, proximity data sensed by the proximity device is sent to another computing device, such as a VR headset or a central computing device. In this example, the processor is a component of the computing device such that the proximity sensing is distributed between the proximity device and the computing device. In addition, although the operations are illustrated in a particular order, some of the operations can be re-ordered or omitted. In the interest of clarity of explanation, a single user and a single object are illustrated. However, the operations similarly apply to a larger number of users and/or objects.

In an example, the flow includes an operation 1002, where a signal is transmitted. For instance, the processor controls a rate of transmission of an RF, IR, acoustic signal, or laser light signal from a proximity sensor of the proximity device. A transmitter of the proximity sensor transmits a transmitted signal outwards in the physical environment.

In an example, the flow includes an operation 1004, where a reflected signal is received. For instance, the processor controls a receiver of the proximity sensor. The receiver receives the reflected signal. The reflected signal corresponds to a reflection of the transmitted signal from the object.

In an example, the flow includes an operation 1006, where a proximity of the object is determined. For instance, the proximity includes a distance and, optionally, a direction between the proximity device and the object. The processor analyzes the transmitted signal and/or the reflected signal to determine the distance and direction. The distance can be derived from the strength of the reflected signal (e.g., the relative strength in comparison to the strength of the transmitted signal), a time of flight of the signal (transmitted and received signals), and/or frequency of the reflected signal (or other measurable Doppler effects). When the proximity device includes multiple proximity sensors, the direction can be derived using triangulation techniques.

In an example, the flow includes an operation 1008, where the perimeter of the area is defined based on the proximity. For instance, the processor defines the perimeter such that the object is outside of the area. In particular, the processor defines a section of the perimeter based on the proximity using different techniques. One technique includes defining a stay-out sub-area around the object. In another technique, the location of the object is connected to a location of a another object to define the section of the perimeter. In a further technique, the object can include the user, where the user is walking around the area and providing commands to set the perimeter.

In an example, the flow includes an operation 1010, where the user is detected to be within a threshold distance from the perimeter. This can be expressed as the proximity of the user to the perimeter. The proximity includes the user's distance from the proximity device or the user's distance to the perimeter. The proximity can also include the user's direction relative to the proximity device. The threshold distance represents an inner perimeter that, once crossed, the user may be getting too close to the perimeter of the area. Different proximity detection techniques are available. The processor executes one or a combination of such techniques. One example technique involves data communication between the proximity device and a VR headset of the user, as further described at operation 1030. Other example techniques involve proximity sensing based on signals reflected from the user, as further described at operation 1040 and 1050.

In an example, the flow includes an operation 1030, where the proximity of the user to the perimeter of the area is detected based on data communication between the proximity device and the VR headset of the user. For instance, the two devices use short range, low energy wireless communication network. The threshold distance from the proximity device is mapped to a threshold signal strength. The distance from the proximity device to the perimeter is also mapped to a second signal strength. If the processor detects that the signal strength falls between the threshold signal strength and the second signal strength, the processor detects that the user has crossed the threshold distance and is in proximity of the perimeter.

In an example, the flow includes an operation 1040, where the proximity of the user to the perimeter of the area is detected based on a reflected signal from the user. For instance, a signal is transmitted from the proximity device (e.g., a proximity sensor thereof) and is reflected from the user. The reflected signal is received by the proximity device (e.g., the proximity sensor). The processor analyzes the transmitted signal and/or the reflected signal to determine the distance and, as applicable, direction.

In an example, the flow includes an operation 1050, where the proximity of the user to the perimeter of the area is detected based on a calibration of the proximity device. Here, the detection may still be based on signal reflection from the user. However, rather than using signal strength, time of flight, or Doppler effects, the processor relies on the calibration. For instance, the calibration results in a signal range for a particular signal parameter (e.g., electromagnetic field-related parameter, capacitance-related parameter, etc.). One end of the signal range corresponds to the user being located outside of the area. Another end of the signal range corresponds to the user being located close to the proximity device. A threshold point is set as a value in the signal range. In operation, the processor measures the value of the parameter from the transmitted and reflected signals and compares the measured value to the threshold point. The proximity of the user to the perimeter is determined based on where the measured value falls in the signal range relative to the threshold point.

In an example, the flow includes an operation 1012, where an indication of the user being located within the threshold distance is generated. For instance, the processor generates a proximity indication if the user is determined to have crossed the inner perimeter. The proximity indication indicates the distance of the user to the perimeter, the inner perimeter, and/or the proximity device. The proximity indication also indicates an adjustment based on the direction and distance. The adjustment instructs the user to move in a certain direction by a certain distance to back away from the perimeter and relocate within the inner perimeter.

In an example, the flow includes an operation 1014, where a presentation of the indication is caused. For instance, the processor initiates the presentation of the proximity indication locally on the proximity device or sends the proximity indication to the VR headset for presentation thereat. The presentation can take different presentation modalities, including tactile, audible, and visual presentations.

In an example, the flow includes an operation 1016, where a proximity of a new object to the perimeter of the area is detected. The new object can include but not need be a new user. For instance, the processor detects that the new object has crossed the perimeter and entered the area based on proximity sensing. The proximity devices uses any or a combination of the techniques described in connection with operations 1030, 1040, and 1050.

In an example, the flow includes an operation 1018, where an indication of the proximity of the new object to the perimeter is generated and presented. For instance, the processor generates an entry indication that indicates that the object has crossed the perimeter. The entry indication can include the distance of the new object from the perimeter, the inner perimeter, the proximity device, and/or the user. The entry indication can also include the direction of the new object relative to the proximity device and/or user. Generally, the processor initiates the presentation of the entry indication locally on the proximity device and sends the entry indication to the user's VR headset for presentation thereat. If the new object is a new user also operating a VR headset, the processor can also send the entry indication to this VR headset for presentation to the new user.

In an example, the flow includes an operation 1020, where a proximity of the new object to the user is detected. For instance, the processor determines the proximity based on a motion vector of the user and a motion vector of the new object. This proximity includes the distance and, as applicable, the direction between the two.

In an example, the flow includes an operation 1022, where an indication of the new object-to-user proximity is generated and presented. For instance, if the new object is too close (e.g., the proximity indicates a potential collision), the processor generates a collision indication. The collision indication identifies the distance, and as applicable, the direction between the user and the new object. The collision indication also indicates an adjustment based on the direction and distance. The adjustment instructs the user to move in a certain direction by a certain distance to avoid the collision. If the new object is a new user, the adjustment can likewise instruct the new user. Generally, the processor initiates the presentation of the collision indication locally on the proximity device and sends the collision indication to the user's VR headset for presentation thereat. If the new object is a new user also operating a VR headset, the processor can also send the collision indication to this VR headset for presentation to the new user.

Figure 11:
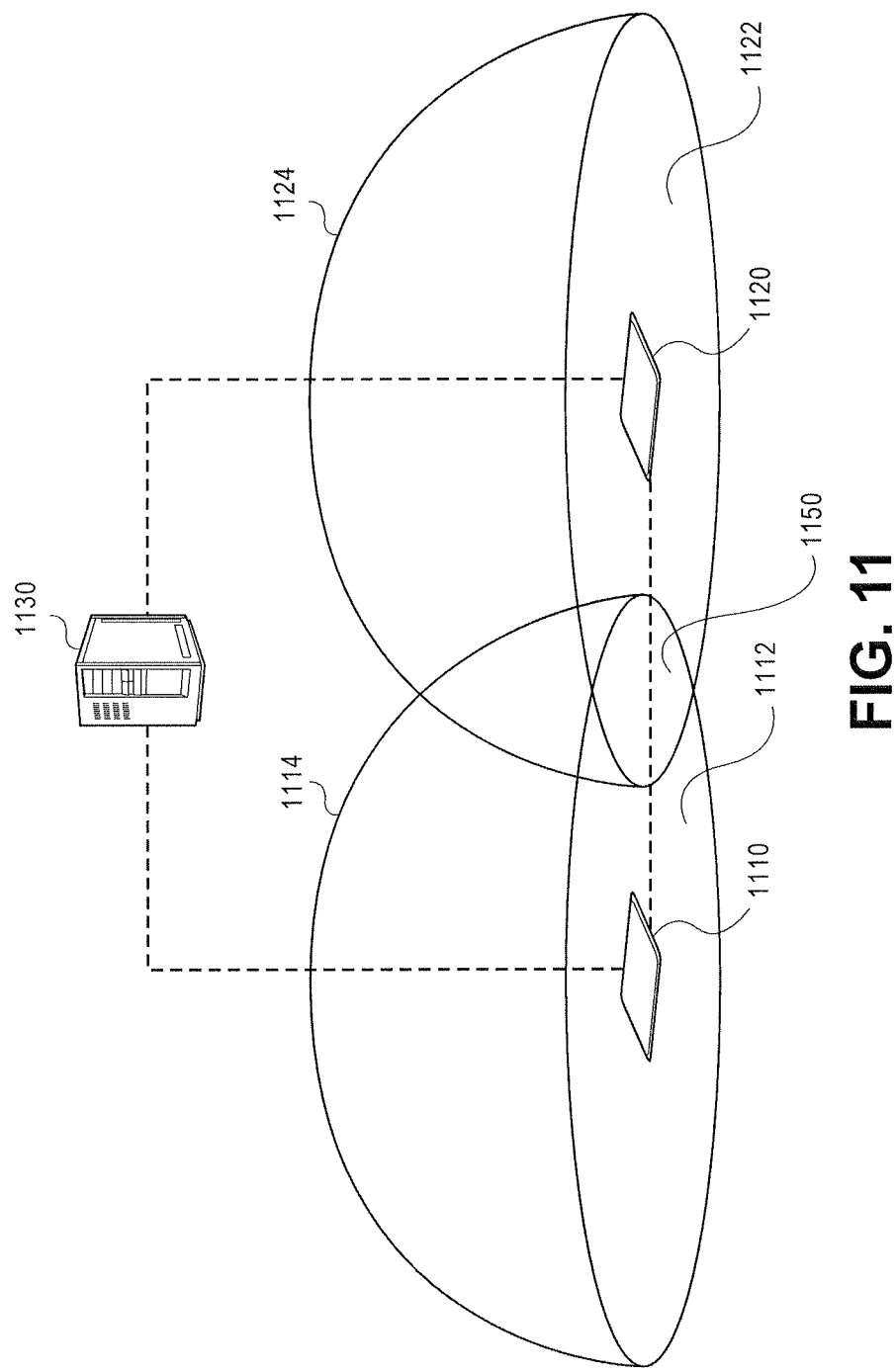
FIG. 11 illustrates an example network of proximity devices according to an embodiment of the present disclosure.

FIG. 11 illustrates an example network of proximity devices. Each proximity device defines an individual area (or, similarly, an individual volume) within which proximity is monitored. The network defined an overall area formed by the individual areas. Proximity is monitored within the overall area. One or more users operating respective VR headsets can be located within the overall area and alerted about different types of proximities with respect to the overall area.

A first proximity device 1110 and a second proximity device 1120 are illustrated as belonging to the network. However, the network can include a larger number of proximity devices. The proximity device 1110 monitors proximity within a volume 1114 that has a footprint area 1112. Similarly, the proximity device 1120 monitors proximity within a volume 1124 that has a footprint area 1122. An intersection of the two areas 1112 and 1122 defines an overlap area 1150. In each area, a threshold distance is used to monitor the proximity. The threshold distance need not but can be the same across the two areas 1112 and 1122.

In an example, a single user is associated with the overall area. In this example, the overall area can be set as a stay-in area or a stay-out area for the user. In this case, the overlap 1150 area can be used in a handoff of the user between the two proximity devices 1110 and 1120 for proximity monitoring purposes. For instance, assume that the user is in the first area 1112 and that the first area 1112 is a stay-in area. The first proximity device 1110 senses the proximity of the user while in this area. If the user approaches the perimeter of the first area 1112 at a location other than the overlap area 1150, the user is alerted of the proximity to the perimeter. For instance, a proximity indication is sent to the user's VR headset. As the user enters the overlap area 1150, the handoff is initiated. In this area, both proximity devices 1110 and 1120 simultaneously monitor the user's proximity. No proximity alert is sent to the user. As the user leaves the overlap area 1150 and enters the remaining portion of the second area 1122, the handoff is complete. The first proximity device 1110 need not monitor the user's proximity anymore and need not generate a proximity indication to alert the user. Instead, the second proximity device 1120 becomes responsible for the proximity monitoring while the user is in the second area 1122.

In another example, one of the areas 1112 and 1122 can be set as a stay-in area while the other one is set as a stay-out area. For instance, the first area 1112 is set as the stay-in area. If the user approaches the first area's 1112 perimeter or the overlap area 1150 (e.g., within any threshold distance), the user is alerted of the proximity to the perimeter of the first area 1112 or the perimeter of the second area 1122.

In both of the above examples, the user can be alerted when a new object enters either areas 1112 and 1122. For instance, if the user is in the first area 1112 and the new object enters the second area 1122, the user is informed that an object has moved to the second area 1122. In comparison, if the new object enters the first area 1112 where the user is located, the user is further alerted of the proximity of the new object to the user.

In a further example, a second user (or a larger number of users) is also associated with the overall area. In this example, the overall area can also be a stay-in or a stay-out area for the second user. Alternatively, the first area 1112 can be set as a stay-in area for the first user and a stay-out area for the second user, whereas the second area 1122 can be set the other way around. In this case, if the first user moves into the overlap area 1150, the two users are alerted about the proximity of the first user to the second area 1122. In comparison, if the first user approaches (e.g., within a threshold distance) the perimeter of the first area 1112 at a location other than the overlap area 1150, only the first user may be alerted of the proximity.

Here also, the users can be alerted when a new object enters either areas 1112 and 1122. For instance, assume that the first user is in the first area 1112 and the second user is in the second area 1122. If the new object enters the second area 1122, the first user is informed that an object has moved to the second area 1122. In comparison, the second user is alerted of the proximity of the new object to the second user.

In an example, the two proximity devices 1110 and 1120 are in data communication with a central computer 1130. The central computer 1130 can be located in the physical environment that contains the two areas 1112 or 1122 (and can be even located in one of the two areas 1112 or 1122) or can be remote from the physical environment (e.g., can be a cloud-based computing service). The data communication occurs over a LAN, a private network (e.g., an Intranet), or a public network (the Internet). Generally, the central computer 1130 manages proximity-related operations of the proximity devices 1110 and 1120. For instance, the central computer 1130 defines the overall and individual parameters, calibrates the proximity devices 1110 and 1120, receives proximity data from the proximity devices 1110 and 1120, generates indications of proximities (e.g., proximity indications, entry indications, and collision indications), activates the proximity devices 1110 and 1120 to present the indications, and/or sends the indications to one or more VR headsets.

In another example, the central computer 1130 need not be used. Instead, the proximity devices 1110 and 1120 form a point-to-point network or a mesh network. The proximity-related operations can be distributed between the proximity devices 1110 and 1120. Alternatively, one of the proximity devices 1110 and 1120 can be set as a master device that manages these operations.

Although FIG. 11 illustrates a proximity device that monitors a single area, other mappings between proximity devices and areas are possible. Mapping examples include a one-to-one mapping (as illustrated in FIG. 11), a one-to-many mapping, or a many-to-one mapping. For instance, the area 1112 can be split into three sub-areas. The proximity device 1110 can monitor proximity within two of the three sub-areas.

Figure 12:
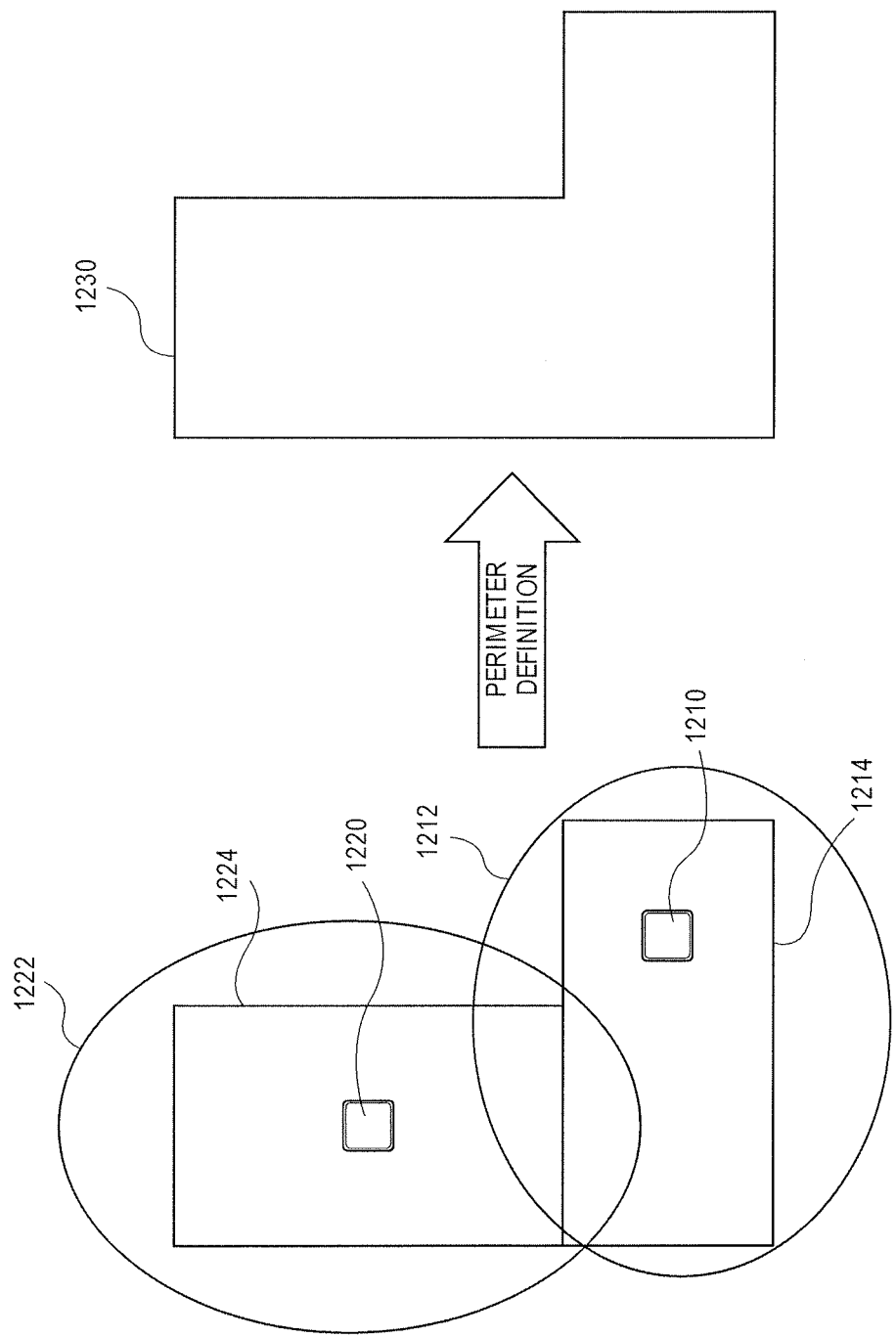
FIG. 12 illustrates a top view of a perimeter of an area, where the perimeter is defined based on a network of proximity devices according to an embodiment of the present disclosure.

FIG. 12 illustrates a top view of a perimeter of an area, where the perimeter is defined based on a network of proximity devices. The network includes a first proximity device 1210 and a second proximity device 1220 and defines an "L" shaped perimeter 1230. A larger number of proximity devices can also be used and/or a different shaped perimeter can be defined.

The first proximity device 1210 covers a first potential area 1212 within which proximity can be monitored. As described in connection with FIGS. 5 and 6, an actual monitoring area having a particular shape and size can be defined based on hardware and/or software capabilities of the proximity device 1210, user preference, and/or objects in the physical environment. FIG. 12 illustrates setting the actual monitoring area to have a rectangular perimeter 1214.

Similarly, the second proximity device 1220 covers a second potential area 1222 within which proximity can be monitored. An actual monitoring area is also set within the potential area 1222, where the actual monitoring area has a rectangular perimeter 1224.

Different techniques are available to set an actual monitoring area around a proximity device (e.g., either of the two proximity devices 1210 and 1220). In one example, the proximity device includes a mode button. The mode button allows the user to select a shape and/or size of the actual monitoring area. In another example, the user walks within the potential area and provides commands (e.g., oral commands or commands via a portable device) to the proximity device. In turn, the proximity device defines the actual monitoring area accordingly. In yet another example, a central computer manages the area definition and is in data communication with the proximity device. The central computer provides an interface to the user. The user operates the interface to define the actual monitoring area (or, similarly, the overall area). The central computer remotely controls the proximity device to monitor proximity within the defined area. Alternatively, the central computer filters out proximity data for objects that fall outside of the defined area.

Once the individual perimeters 1212 and 1222 are defined, the collection of the two defines the overall perimeter 1230 (shown as an "L" shaped perimeter). The overall perimeter 1230 defines a boundary for the overall area within which the proximity is monitored. A threshold distance can be defined around the overall perimeter 1230. For instance an inner perimeter and/or an outer perimeter are defined with an inner offset and an outer offset, respectively, from the overall perimeter 1230. Each offset corresponds to a threshold distance. Proximity within the area is detected based on a user or an object crossing the inner perimeter or the outer perimeter.

Although FIG. 12 illustrates the proximity devices 1210 and 1220 being located within the perimeters 1214 and 1224, respectively, a proximity device can be located at other locations with respect to a perimeter. For instance, the proximity device 1210 can be located outside or on a point of the perimeter 1214.

Figure 13:
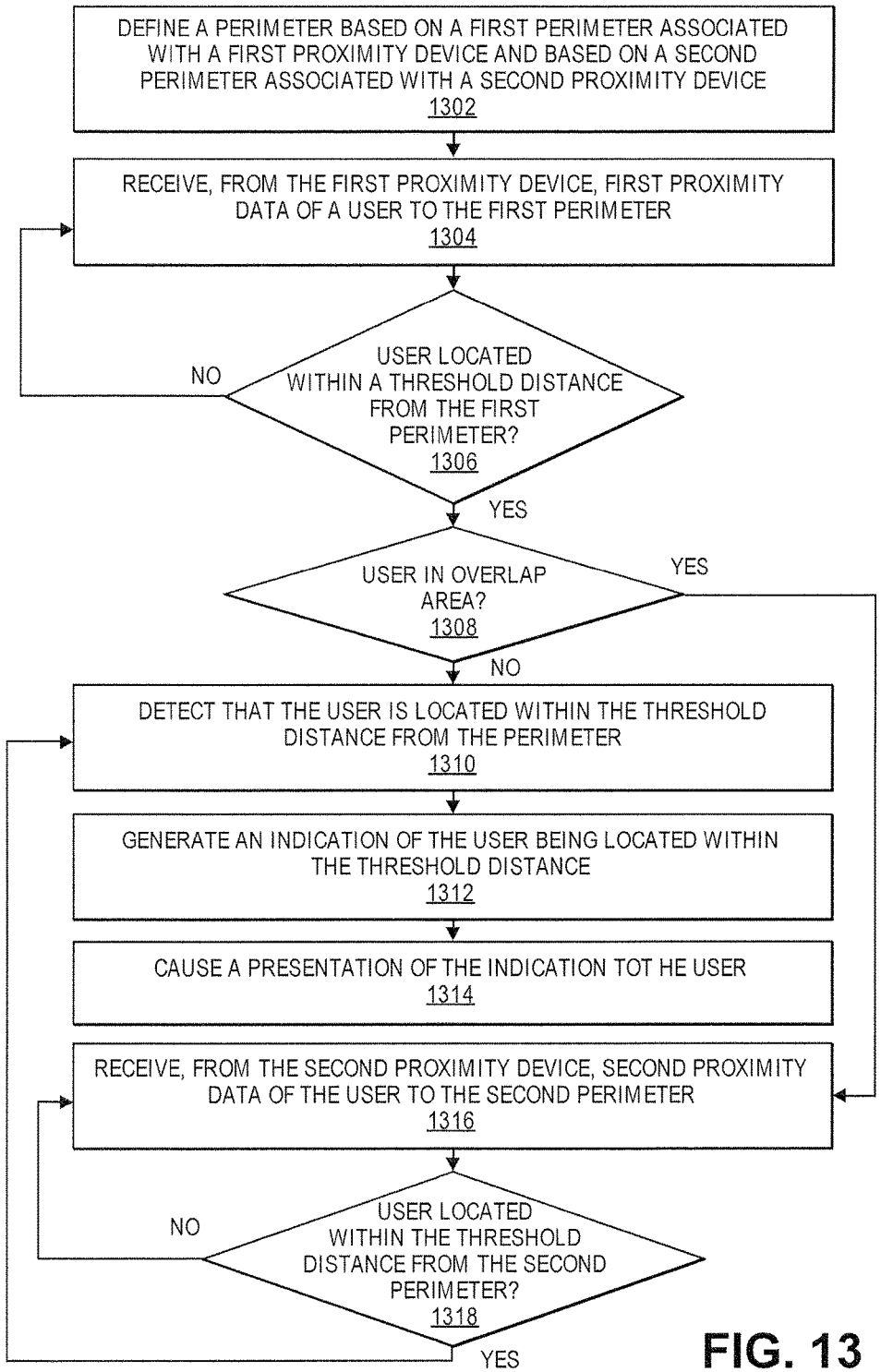
FIG. 13 illustrates an example flow for operating a network of proximity devices according to an embodiment of the present disclosure.

FIG. 13 illustrates an example flow for operating a network of proximity devices. The network is used to sense proximity of a user to an overall perimeter of an overall area in a physical environment. The overall area includes a number of individual areas. Each individual area is bounded by a perimeter and is associated with a proximity device of the network. A processor is illustrated as performing operations of the flow. For example, the processor executes computer-readable instructions stored in a memory coupled to the processor. The computer-readable instructions include instructions for performing the operations. In an example, the processor is a component of a central computer. In another example, the processor is a component of one of the proximity devices of the network (e.g., a "master" proximity device). In another example, the processor represents processing capabilities distributed across the proximity devices. In addition, although the operations are illustrated in a particular order, some of the operations can be re-ordered or omitted. In the interest of clarity of explanation, a single user and two individual areas associated with two respective proximity devices are illustrated. However, the operations similarly apply to a larger number of users, larger number of areas, and/or different number of proximity devices.

In an example, the flow includes an operation 1302, where the overall perimeter is defined based on a first perimeter associated with a first proximity device and a second perimeter associated with a second proximity device. The first and second proximity devices belong to the network of proximity devices. The first proximity device monitors proximity within the first perimeter that bounds a first area. Likewise, the second proximity device monitors proximity within the second perimeter that bounds a second area. In an illustration, the processor defines the first perimeter and the second perimeter based on proximity-related capabilities of the proximity devices, user preference, and/or objects in the physical environment. The overall perimeter is defined as a collection of the first perimeter and the second perimeter.

In an example, the flow includes an operation 1304, where first proximity data is received from the first proximity device. For instance, the processor receives the first proximity data from the first proximity device based on a pull or push mechanism. The first proximity data includes proximity-related information about the proximity (e.g., distance and direction) of the user to the first perimeter.

In an example, the flow includes an operation 1306, where a determination is made as to whether the user is located with a threshold distance from the first perimeter. For instance, the processor compares the user's distance to the first perimeter to a threshold. If smaller than the threshold, the user is detected to be too close to the perimeter. In that case, operation 1308 is typically followed. Otherwise, the processor determines that the user is properly within the first area and continues the proximity monitoring. As such, operation 1304 is repeated.

In an example, the flow includes an operation 1308, where a determination is made as to whether the user has moved to an overlap area between the first area and the second area. For instance, the processor compares the user's direction relative to the overlap area, the direction indicates whether the user has moved towards the overlap area or to some other location within the first area. The user's direction is available from the proximity determined at operation 1304. In another illustration, the processor receives second proximity data from the second processor. If the second proximity data indicates that the second proximity device has sensed the user, the processor determines that the user is in the overlap area. Otherwise, the user is determined to be located in another location of the first area. If the user is not in the overlap area, operation 1310 is typically followed. On the other hand, if the user is in the overlap area, operation 1316 is typically followed.

In an example, the flow includes an operation 1310, where the user is detected as being located within the threshold distance from the perimeter. For instance, the processor determines that the user is too close to the perimeter (e.g., the user has approached the first perimeter or the second perimeter within the threshold distance and that the user is not in the overlap area).

In an example, the flow includes an operation 1312, where an indication of the user being located within the threshold distance from the perimeter is generated. For instance, the processor generates a proximity indication that the user has approached the perimeter (e.g., depending on which perimeter the user has approached, the indication can also identify the first or second perimeter and provide an adjustment to avoid leaving the overall area).

In an example, the flow includes an operation 1314, where a presentation of the indication is caused. For instance, the processor instructs the first proximity device, the second proximity device, and/or a VR headset to present the proximity indication using different presentation modalities.

In an example, the flow includes an operation 1316, where second proximity data is received from the second proximity device. At this operation, the user has either entered the overlap area or has moved into the second area. In such a case, a handoff of the proximity sensing may take place. In an illustration, the processor receives the second proximity data from the first proximity device based on a pull or push mechanism. If a pull mechanism is used, the handoff triggers the processor to request the second proximity data from the second proximity device. The second proximity data includes proximity-related information about the proximity (e.g., distance and direction) of the user to the second perimeter.

In an example, the flow includes an operation 1318, where a determination is made as to whether the user is located with a threshold distance (e.g., a same or a different threshold distance as in operation 1306) from the second perimeter or has moved again to the overlap area. For instance, the processor compares the user's distance to the second perimeter to a threshold, determines the user's direction relative to the overlap area, and/or receives additional proximity data from the first proximity device. Similarly to operations 1306 and 1308, the processor determines whether the user is properly still within the second area or not. If so, operation 1314 is typically repeated to continue the proximity monitoring of the user within the second area. Otherwise, operation 1310 is typically followed.

Figure 14:
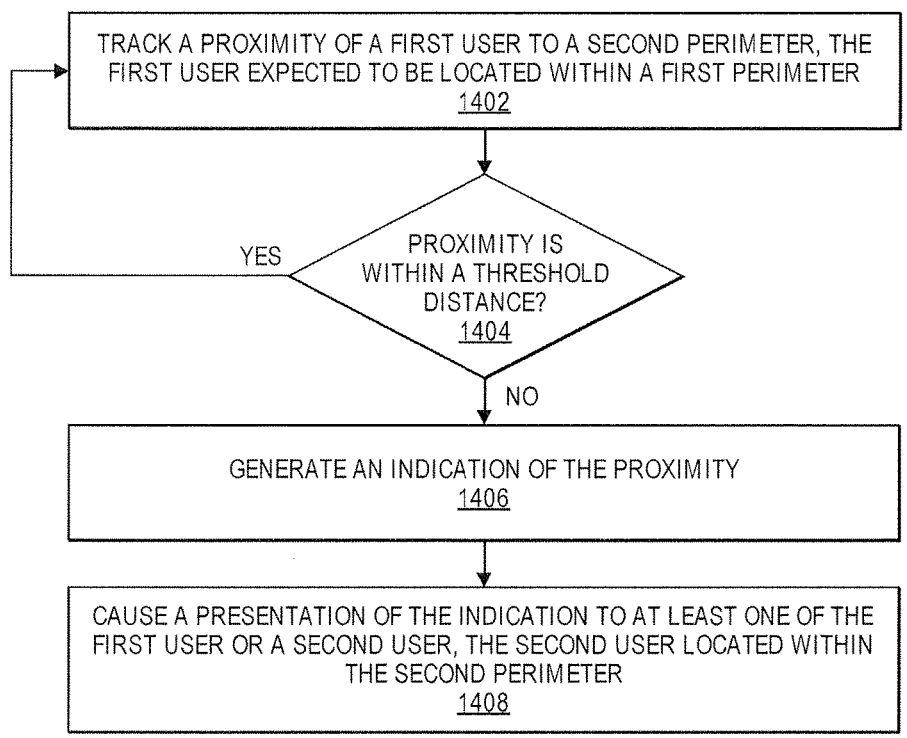
FIG. 14 illustrates an example flow for monitoring a proximity of a first user relative to a second user based on a network of proximity devices according to an embodiment of the present disclosure.

FIG. 14 illustrates an example flow for monitoring a proximity of a first user relative to a second user based on a network of proximity devices. A processor is illustrated as performing operations of the flow. For example, the processor executes computer-readable instructions stored in a memory coupled to the processor. The computer-readable instructions include instructions for performing the operations. In an example, the processor is a component of a central computer. In another example, the processor is a component of one of the proximity devices of the network (e.g., a "master" proximity device). In another example, the processor represents processing capabilities distributed across the proximity devices. In addition, although the operations are illustrated in a particular order, some of the operations can be re-ordered or omitted. In the interest of clarity of explanation, two users and two areas associated with two respective proximity devices are illustrated. However, the operations similarly apply to a larger number of users, larger number of areas, and/or a different number of proximity devices.

In an example, the flow includes an operation 1402, where a proximity of the first user is tracked relative to a second perimeter of a second area. The first user is expected to be located within a first perimeter of a first area. The second area is occupied by the second user. In other words, the first area and the second area represent a stay-in area and a stay out-area, respectively, for the first user. In an illustration, the processor tracks the proximity of the user based on proximity data from a first proximity device monitoring proximity within the first area and/or a second proximity device monitoring proximity within the second area as described in connection with FIG. 13.

In an example, the flow includes an operation 1404, where a determination is made whether the proximity of the user to the second perimeter is within a threshold distance. For example, the processor compares the distance of the first user to the second perimeter to the threshold distance. If the distance is smaller, the user is too close to the second perimeter. In addition, the processor can also determine whether the direction of the first user indicates that the first user is moving towards the second perimeter or not. If the first user is too close and/or is moving towards the second perimeter, operation 1406 is typically performed. Otherwise, operation 11402 is typically repeated to continue the proximity monitoring of the first user.

In an example, the flow includes an operation 1406, where an indication of the proximity is generated. For instance, the processor generates an entry indication. The entry indication indicates that the first user is about to cross the second perimeter. The entry indication can also suggest an adjustment such that the first user returns back to the first area.

In an example, the flow includes an operation 1408, where a presentation of the indication is caused to at least one of the first user or the second user. For instance, the processor instructs the proximity device in the first area and/or the proximity device in the second area to present the entry indication using different presentation modalities. In addition, the processor sends the entry indication a first VR headset of the first user and a second VR headset of the second user for presentations thereat. The entry indication sent to the first VR headset can include the suggested adjustment.

Figure 15:
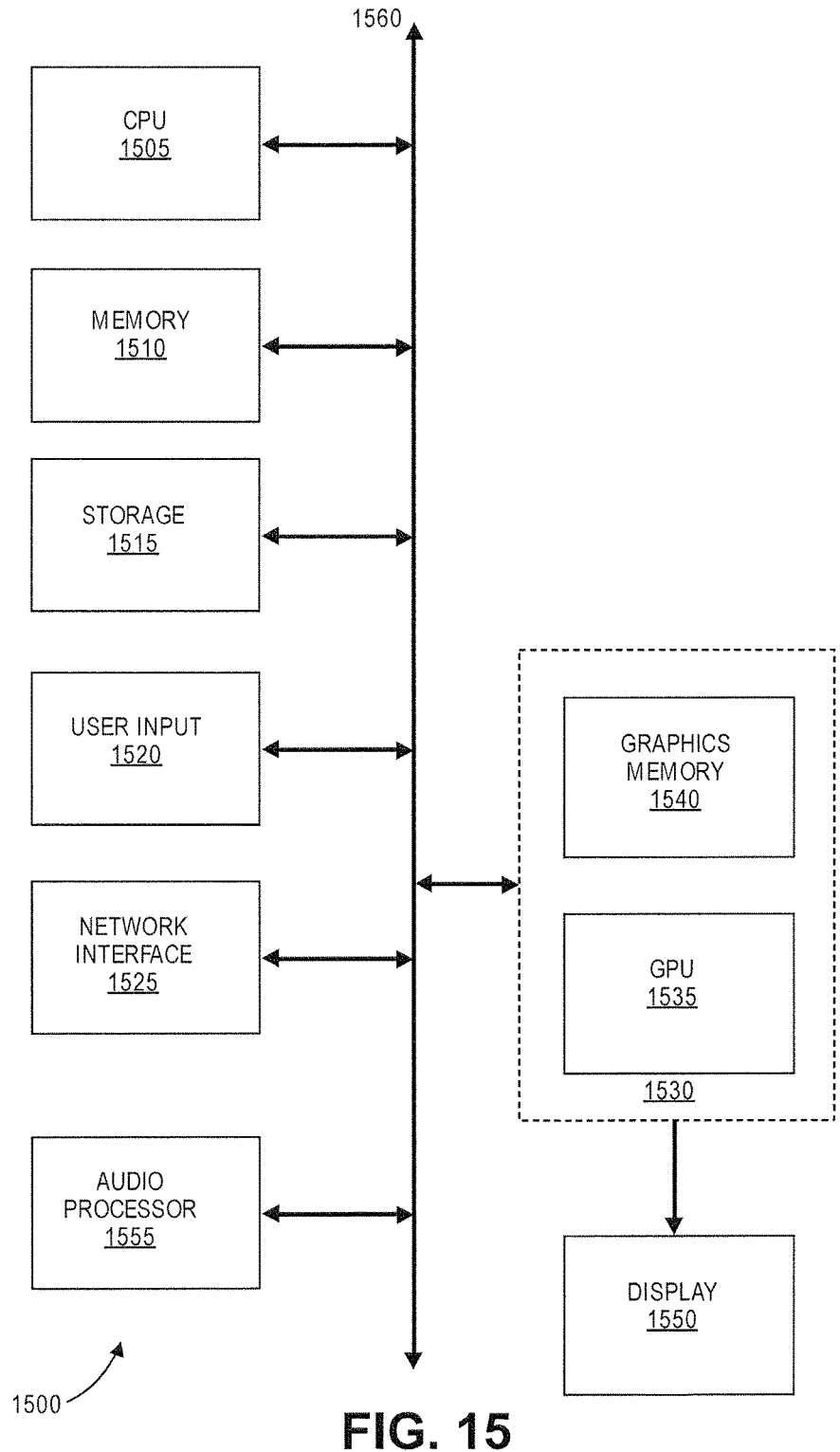
FIG. 15 illustrates an example of a hardware system suitable for implementing a computer system in accordance with various embodiments.

FIG. 15 illustrates an example of a hardware system suitable for implementing a computer system 1500 in accordance with various embodiments. The computer system 1500 includes, for example, components of an imaging device, a back end system, a VR headset, and/or other end user devices. The computer system 1500 includes a central processing unit (CPU) 1505 for running software applications and optionally an operating system. The CPU 1505 may be made up of one or more homogeneous or heterogeneous processing cores. Memory 1510 stores applications and data for use by the CPU 1505. Storage 1515 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1520 communicate user inputs from one or more users to the computer system 1500, examples of which may include keyboards, mice, joysticks, touch pads, touch screens, still or video cameras, and/or microphones. Network interface 1525 allows the computer system 1500 to communicate with other computer systems via an electronic communications network, and may include wired or wireless communication over local area networks and wide area networks such as the Internet. An audio processor 1555 is adapted to generate analog or digital audio output from instructions and/or data provided by the CPU 1505, memory 1510, and/or storage 1515. The components of computer system 1500, including the CPU 1505, memory 1510, data storage 1515, user input devices 1520, network interface 1525, and audio processor 1555 are connected via one or more data buses 1560.

A graphics subsystem 1530 is further connected with the data bus 1560 and the components of the computer system 1500. The graphics subsystem 1530 includes a graphics processing unit (GPU) 1535 and graphics memory 1540. The graphics memory 1540 includes a display memory (e.g., a frame buffer) used for storing pixel data for each pixel of an output image. The graphics memory 1540 can be integrated in the same device as the GPU 1535, connected as a separate device with the GPU 1535, and/or implemented within the memory 1510. Pixel data can be provided to the graphics memory 1540 directly from the CPU 1505. Alternatively, the CPU 1505 provides the GPU 1535 with data and/or instructions defining the desired output images, from which the GPU 1535 generates the pixel data of one or more output images. The data and/or instructions defining the desired output images can be stored in the memory 1510 and/or graphics memory 1540. In an embodiment, the GPU 1535 includes 3D rendering capabilities for generating pixel data for output images from instructions and data defining the geometry, lighting, shading, texturing, motion, and/or camera parameters for a scene. The GPU 1535 can further include one or more programmable execution units capable of executing shader programs.

The graphics subsystem 1530 periodically outputs pixel data for an image from the graphics memory 1540 to be displayed on the display device 1550. The display device 1550 can be any device capable of displaying visual information in response to a signal from the computer system 1500, including CRT, LCD, plasma, and OLED displays. The computer system 1500 can provide the display device 1550 with an analog or digital signal.

In accordance with various embodiments, the CPU 1505 is one or more general-purpose microprocessors having one or more processing cores. Further embodiments can be implemented using one or more CPUs 1505 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 75%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A wearable proximity apparatus comprising:
a housing configured to be worn by a user;
a transmitter coupled with the housing, the transmitter configured to transmit a transmitted signal in a direction outward from the user;
a receiver coupled with the housing, the receiver configured to receive a reflected signal based on a reflection of the transmitted signal from an object; and
a signal processor communicatively coupled with a memory and the receiver, wherein the memory stores computer-readable instructions that, upon execution by the signal processor, cause the wearable proximity apparatus to:

detect a proximity of the object to the user, the proximity detected based on the reflected signal and based on the wearable proximity apparatus being located on the user;

classify the object as a potential obstacle for the user based on a comparison of the proximity and a threshold;

generate an indication of the potential obstacle; and transmit the indication of the potential obstacle to a virtual reality headset for presentation to the user.

2. The wearable proximity apparatus of claim 1 further comprising:

a millimeter wave antenna electronically coupled with the receiver, the antenna having a main lobe directed normal from the user when the user wears the housing; and an audio speaker, wherein the transmitter is configured to transmit the transmitted signal as a pulse and the signal processor is configured to measure a time of flight of the transmitted signal and reflected signal, the proximity calculated from the measured time of flight, and wherein the audio speaker is configured to sound upon generation of the indication.

3. The wearable proximity apparatus of claim 1, wherein the proximity comprises an approximate distance between the object and the wearable proximity apparatus, and wherein the approximate distance is measured based on one or more of: a strength of the reflected signal, a time of flight of the transmitted signal and reflected signal, or a Doppler effect associated with the transmitted signal and reflected signal.

4. The wearable proximity apparatus of claim 3, further comprising a plurality of transceivers, wherein the proximity further comprises an approximate direction between the object and the wearable proximity apparatus, wherein the approximate distance is measured based on a plurality of reflected signals that are received by the plurality of transceivers.

5. The wearable proximity apparatus of claim 4, wherein the computer-readable instructions, upon execution by the processor, further cause the wearable proximity apparatus to:

generate a motion vector for the object based on the approximate distance and the approximate direction; and detect that the object is the potential obstacle based on the motion vector.

6. The wearable proximity apparatus of claim 5, wherein the computer-readable instructions, upon execution by the processor, further cause the wearable proximity apparatus to:

generate a second motion vector for a second object based on a second proximity of the second object;

determine that the second object belongs to the user based on the second motion vector; and flag the second object as belonging to the user.

7. The wearable proximity apparatus of claim 1, wherein the computer-readable instructions, upon execution by the processor, further cause the wearable proximity apparatus to:

detect a second proximity of a second object;

receive a second signal transmitted from a second wearable proximity apparatus associated with the second object; and flag the second object as belonging to the user based on the second signal.

8. The wearable proximity apparatus of claim 1, wherein the transmitted signal is selected from a group of a radio frequency (RF) signal, an infrared (IR) signal, an acoustic signal, and a laser light signal, wherein the transmitter and the receiver are part of a proximity sensor of the wearable proximity apparatus, wherein the proximity sensor is selected from a group of an RF sensor, an IR sensor, an acoustic sensor, and a LiDAR sensor.

9. The wearable proximity apparatus of claim 1, wherein the indication of the potential obstacle is transmitted over a data network that comprises one or more of: a point-to-point data network or a local area network communicatively, and wherein the indication causes the virtual reality headset to present a message about the potential obstacle to the user.

10. The wearable proximity apparatus of claim 1, wherein the threshold is based on one or more of: a type of content presented at the virtual reality headset or a user preference stored in a profile of the user.

11. The wearable proximity apparatus of claim 1, wherein the transmission of the indication of the potential obstacle is for presentation at the virtual headset to the user, wherein the indication is transmitted over a data network configured to communicatively couple the wearable proximity apparatus and the virtual reality headset.

12. A proximity apparatus communicatively coupled to a virtual reality headset, the proximity apparatus comprising:

a transmitter configured to transmit a transmitted signal;

a receiver configured to receive a reflected signal based on a reflection of the transmitted signal from an object in a physical environment; and a processor communicatively coupled with a memory and with a receiver, wherein the memory stores computer-readable instructions that, upon execution by the processor, cause the proximity apparatus to:

detect a proximity of the object to the proximity apparatus based on the reflected signal;

define a perimeter of an area within the physical environment based on the proximity of the object;

detect that a user of the virtual reality headset is within a threshold distance from the perimeter based on signal communication between the proximity apparatus and the virtual reality headset;

generate an indication of the user being located within the threshold distance; and provide the indication to the virtual reality headset for presentation to the user.

13. The proximity apparatus of claim 12, wherein the area excludes the object.

14. The proximity apparatus of claim 12, wherein the area comprises the proximity apparatus, wherein the perimeter of the area is defined based on a lower bound of a signal range, wherein the signal range is generated based on a first signal calibration and a second signal calibration, wherein the first signal calibration is performed with the user being outside of the area, and wherein the second signal calibration is performed with the user being within the area in proximity of the proximity apparatus.

15. The proximity apparatus of claim 14, wherein detecting that the user is within the threshold distance comprises:

receive a second reflected signal from the user; and determine that a parameter of the second reflected signal falls between the lower bound and a point of the signal range, wherein the point is mapped to the threshold distance.

16. The proximity apparatus of claim 12, wherein the transmitter and the receiver are part of a proximity sensor of the proximity apparatus, wherein the proximity sensor comprises one or more of: a radio frequency (RF) sensor, an infrared (IR) sensor, an acoustic sensor, or a LiDAR sensor, and wherein detecting that the user is within the threshold distance comprises tracking a proximity of the user to the proximity apparatus based on a RF signal, an IR signal, an acoustic signal, or a laser light signal of the proximity sensor.

17. The proximity apparatus of claim 12, wherein the perimeter is defined based on communication with a portable device of the user, wherein a first point of the perimeter corresponds to a first location of the portable device within the environment, wherein a second point of the perimeter corresponds to a second location of the portable device within the environment, and wherein the first point is determined based on the communication with the portable device and based on a reflected signal from the user corresponding to the user being located at the first location.

18. The proximity apparatus of claim 12, wherein the computer-readable instructions, upon execution by the processor, further cause the proximity apparatus to:
   detect that a second object has entered the perimeter of the area; and
   generate a second indication of the second object being located within the area.

19. The proximity apparatus of claim 12, wherein the computer-readable instructions, upon execution by the processor, further cause the proximity apparatus to:
   track a second user located within the area;
   detect that a second proximity between the second user and the user is within a second threshold distance; and
   generate a second indication of the second user being located within the second threshold distance.

20. The proximity apparatus of claim 12, wherein the area is a stay-in area for user, wherein the computer-readable instructions, upon execution by the processor, further cause the proximity apparatus to:
   track a second user of a second virtual reality headset, wherein the second user is located outside of the area, wherein the area is a stay-out area for the second user;
   detect that the second user has moved to be within the area;
   provide a second indication of the second user being located within the area to at least one of: the virtual reality headset or the second virtual reality headset;
   detect that the user has moved outside the area; and
   provide a third indication of the user being located outside of the area to at least one of: the virtual reality headset or the second virtual reality headset.

21. A proximity system comprising:

a first proximity device configured to generate first proximity data, wherein the first proximity data indicates a first proximity of a user of a virtual reality headset to a first perimeter of a first area within a physical environment;

a second proximity device configured to generate second proximity data, wherein the second proximity data indicates a second proximity of the user of the virtual reality headset to a second perimeter of a second area within the physical environment; and a processor communicatively coupled with a memory, the first proximity device, and the second proximity device, wherein the memory stores computer-readable instructions that, upon execution by the processor, cause the proximity system to:
   define a perimeter of an area within the physical environment based on the first perimeter and the second perimeter;
   detect that the user of the virtual reality headset is within a threshold distance from the perimeter based on the first proximity data and the second proximity data; and
   generate an indication of the user of the virtual reality headset is being located within the threshold distance.

\* \* \* \* \*